US012771444B2

(12) United States Patent
Senoo et al.

(10) Patent No.: US 12,771,444 B2
(45) Date of Patent: Oct. 20, 2026

(54) OPTICAL ACCESS SYSTEM AND MONITORING METHOD

(71) Applicant: NTT, Inc., Tokyo (JP)

(72) Inventors: Yumiko Senoo, Musashino (JP); Kazutaka Hara, Musashino (JP); Shin Kaneko, Musashino (JP); Ryo Koma, Musashino (JP); Kazuaki Honda, Musashino (JP)

(73) Assignee: NTT, Inc., Tokyo (JP)

( * ) Notice: Subject to any disclaimer, the term of this patent is extended or adjusted under 35 U.S.C. 154(b) by 212 days.

(21) Appl. No.: 18/285,129

(22) PCT Filed: Apr. 9, 2021

(86) PCT No.: PCT/JP2021/015019
§ 371 (c)(1),
(2) Date: Sep. 29, 2023

(87) PCT Pub. No.: WO2022/215251
PCT Pub. Date: Oct. 13, 2022

(65) Prior Publication Data
US 2024/0187092 A1 Jun. 6, 2024

(51) Int. Cl.
*H04B 10/077* (2013.01)
*H04B 10/27* (2013.01)
*H04J 14/02* (2006.01)

(52) U.S. Cl.
CPC ......... *H04B 10/0773* (2013.01); *H04B 10/27* (2013.01); *H04J 14/0307* (2023.08)

(58) Field of Classification Search
CPC .. H04B 10/0773; H04B 10/27; H04J 14/0307
See application file for complete search history.

(56) References Cited

U.S. PATENT DOCUMENTS 5,500,756 A 3/1996 Tsushima et al.
5,894,362 A 4/1999 Onaka et al.
(Continued)

FOREIGN PATENT DOCUMENTS

JP H5-130058 A 5/1993
JP 2001-160820 A 6/2001
(Continued)

OTHER PUBLICATIONS

Takuya Kanai et al., Photonic Gateway for All-Photonics Network, B-8-20, p. 141, Mar. 2021, IEICE.
(Continued)

*Primary Examiner* — David C Payne
(74) *Attorney, Agent, or Firm* — Harness, Dickey & Pierce, P.L.C.

(57) ABSTRACT

An optical access system that performs communication using an optical signal in which a management control signal used for management and control is superimposed in a plurality of transmission lines connecting a plurality of subscriber devices, in which the plurality of subscriber devices generates a plurality of optical signals by superimposing the management control signals of different frequencies on main signals of different wavelengths, and transmits the plurality of optical signals that has been generated, and the optical access system includes a monitoring unit that receives the plurality of optical signals transmitted from the plurality of corresponding subscriber devices, and acquires a plurality of management control signals of different frequencies from the plurality of corresponding optical signals that has been received.

9 Claims, 14 Drawing Sheets

(56) References Cited

U.S. PATENT DOCUMENTS

| | | | |
|---|---|---|---|
| 6,335,810 | B1 | 1/2002 | Uehara |
| 6,891,995 | B2 | 5/2005 | Ikushima et al. |
| 8,886,036 | B2 | 11/2014 | Jeong et al. |
| 9,071,378 | B2 | 6/2015 | Hoshida |
| 10,797,799 | B2 | 10/2020 | Nakagawa et al. |
| 2002/0101635 | A1 | 8/2002 | Taketomi |
| 2006/0133806 | A1 | 6/2006 | Krimmel |
| 2008/0166119 | A1 | 7/2008 | Ryu et al. |
| 2008/0166122 | A1 | 7/2008 | Hsiao |
| 2010/0086304 | A1 | 4/2010 | Mizutani et al. |
| 2011/0116798 | A1* | 5/2011 | Kai .................... H04Q 11/0067 398/58 |
| 2012/0148239 | A1 | 6/2012 | Mori et al. |
| 2015/0229389 | A1 | 8/2015 | Kim et al. |
| 2017/0155981 | A1 | 6/2017 | Nakagawa et al. |
| 2017/0279538 | A1 | 9/2017 | Sone et al. |
| 2018/0359024 | A1 | 12/2018 | Oda et al. |
| 2019/0058541 | A1 | 2/2019 | Abe |
| 2020/0136722 | A1 | 4/2020 | Urban et al. |
| 2020/0313762 | A1 | 10/2020 | Ugajin et al. |
| 2021/0083778 | A1 | 3/2021 | Honda et al. |

FOREIGN PATENT DOCUMENTS

| | | | |
|---|---|---|---|
| JP | 2006-319894 | A | 11/2006 |
| JP | 2012124731 | A | 6/2012 |
| JP | 2014049775 | A | 3/2014 |
| JP | 2014165574 | A | 9/2014 |
| JP | 2016105548 | A | 6/2016 |
| WO | WO-2012/154388 | A1 | 11/2012 |
| WO | WO-2017/090611 | A1 | 6/2017 |
| WO | 2017/159519 | A1 | 9/2017 |
| WO | WO-2018/003095 | A1 | 1/2018 |
| WO | 2019/167797 | A1 | 9/2019 |

OTHER PUBLICATIONS

ITU-T G.989.2 Recommendation, “40-Gigabit-capable-passive optical networks 2(NG PON2): Physical media dependent (PMD) layer specification,” Feb. 2019.

Y. Luo et al., “Physical Layer Aspects of NG-PON2 Standards—Part 2: System Design and Technology Feasibility [Invited]”, J.Opt. Com-mum. Netw., 8(1), pp. 43-52, Jan. 2016.

Masamichi Fujiwara et al., “Increasing Splitting Ratio of 10Gb/s-Class PONs by Using FW-DMF that Acts as Low Loss Splitter for Upstream and Conventional Splitter for Downstream”, OFC, Tu2C, 2014.

Nakagawa Goji et al: “Development of Evaluation Platform of AMCC Superimposition on CPRI Signal Transmission for Mobile Fronthaul Network”, 2017.

* cited by examiner

OPTICAL ACCESS SYSTEM AND MONITORING METHOD

CROSS-REFERENCE TO RELATED APPLICATIONS

This application is a 371 U.S. National Phase of International Application No. PCT/JP2021/015019, filed on Apr. 9, 2021. The entire disclosure of the above application is incorporated herein by reference.

TECHNICAL FIELD

The present invention relates to an optical access system and a monitoring method.

BACKGROUND ART

In the International Telecommunication Union Telecommunication Standardization sector (ITU-T) G. 989.2 Recommendation, a PON system that performs wavelength multiplexing called point to point wavelength division multiplexing-passive optical network (PtP WDM-PON) is defined (see, for example, Non Patent Literature 1). In the PtP WDM-PON system, communication is performed using a different wavelength for each optical network unit (ONU), that is, a subscriber line terminal, in an uplink direction that is a direction from an ONU to an optical line terminal (OLT), that is, a subscriber line terminal, and in a downlink direction that is a direction from the OLT to the ONU.

As described in Non Patent Literature 1, in the PtP WDM-PON system, a management control signal called an auxiliary management and control channel (AMCC) is used as a signal for management and control used between the OLT and the ONU. The AMCC signal is a signal that is transmitted by being superimposed on a main signal after information to be transmitted is modulated by a predetermined method. The AMCC signal includes, for example, state information indicating a transmitting/receiving wavelength, transmission light intensity, temperature, and the like of an optical transceiver.

According to Non Patent Literature 1, there are two types of methods for superimposing the AMCC signal. A first method "baseband modulation" is a method of superimposing an AMCC signal on a main signal as a baseband signal on a transmitter (for example, the ONU) side. In a "baseband modulation" superimposition method, the AMCC signal is separated by a filter such as a low-pass filter (LPF) on the receiver (for example, the OLT) side.

A second method "low-frequency pilot tone" is a method of up-converting the AMCC signal to a certain carrier frequency and superimposing the AMCC signal on the main signal on the transmitter side. In a "low-frequency pilot tone" superimposition method, the AMCC signal is acquired by performing demodulation by signal processing or the like on the receiver side.

FIG. 11 illustrates a configuration of a PtP WDM system using "low-frequency pilot tone". As illustrated in FIG. 11, a conventional PP WDM system 100 includes a subscriber device 200 and a subscriber device 300. The subscriber device 200 is a transmission-side device, and the subscriber device 300 is a reception-side device.

The subscriber device 200 includes an optical transmission unit 210. The optical transmission unit 210 includes a superimposition unit 220 and a laser diode (LD) 230. The subscriber device 200 superimposes, as an electrical signal, a main signal input from the outside and a control signal, and the superimposed electrical signal is converted into an optical signal by the LD 220. Thereafter, the optical transmission unit 210 outputs the optical signal to an optical fiber.

The subscriber device 300 includes an optical reception unit 310. The optical reception unit 310 includes a photo diode (PD) 320 and a low-pass filter (LPF) 330. The subscriber device 300 receives the optical signal transmitted through the optical fiber, and the optical signal is converted into an electrical signal by the PD 320. Thereafter, the subscriber device 300 uses the LPF 330 to separate the AMCC signal from the main signal in an electrical domain and acquire the AMCC signal. In the subscriber device 200 the main signal and the AMCC signal are demodulated at different frequencies so that the main signal and the AMCC signal can be treated as physically different signals.

FIG. 12 illustrates a configuration of another PtP WDM system. As illustrated in FIG. 12, a conventional PtP WDM system 100*a* includes the subscriber device 200, the subscriber device 300, a power splitter 350, a monitoring circuit 400, and a management control unit 450. In FIG. 12, in addition to the configuration illustrated in FIG. 11, the power splitter 350 as a monitoring port is provided in the middle of the optical fiber, and the monitoring circuit 400 capable of receiving an optical signal split by the power splitter 350 and extracting an AMCC signal is provided.

The monitoring circuit 400 includes a PD 410 and an LPF 420. The PD 410 and the LPF 420 perform pieces of processing similar to those of the PD 320 and the LPF 330 included in the optical reception unit. With such a configuration, an AMCC signal can be received without passing through the subscriber device 300. The AMCC signal received by the monitoring circuit 400 is input to the management control unit 450, and, for example, the transmitting/receiving wavelength and the like of the optical transceiver are managed.

While FIG. 12 illustrates a configuration in which the subscriber device 200 transmits an optical signal and the subscriber device 300 receives the optical signal, the configuration may further include the optical reception unit 310 in the subscriber device 200 and further include the optical transmission unit 210 in the subscriber device 300 so as to enable bidirectional communication.

In FIG. 13, a configuration of a WDM system 100*b* in which a plurality of subscriber device pairs use different wavelengths for communication will be described. The WDM system 100*b* includes a plurality of subscriber devices 200-1 to 200-3, a plurality of subscriber devices 300-1 to 300-3, a plurality of power splitters 350-1 to 350-3, a plurality of monitoring circuits 400-1 to 400-3, the management control unit 450, optical SWs 500-1 and 500-2, and a plurality of optical multiplexers/demultiplexers 550-1 to 550-3 and 560-1 to 560-3.

In FIG. 13, in addition to the configuration illustrated in FIG. 12, the plurality of power splitters 350-1 to 350-3, the plurality of monitoring circuits 400-1 to 400-3, the optical SWs 500-1 and 500-2, and the plurality of optical multiplexers/demultiplexers 550-1 to 550-3 and 560-1 to 560-3 are included. The optical SWs 500-1 and 500-2 are provided between the subscriber devices 200-1 to 200-3 and the subscriber devices 300-1 to 300-3, and one optical transmission line can be selected from a plurality of optical transmission lines (in FIG. 13, three optical transmission lines). The optical multiplexers/demultiplexers 550-1 to 550-3 and 560-1 to 560-3 multiplex or demultiplex optical signals output from the optical SWs 500-1 and 500-2. The power splitters 350-1 to 350-3 and monitoring circuits **400*b*-1 to 400*b*-3** are provided in the middle of the optical transmission lines.

The subscriber devices 200-1 to 200-3 transmit optical signals of wavelengths λ1 to λ3, respectively, and the subscriber devices 300-1 to 300-3 receive optical signals of wavelengths λ1 to λ3, respectively. In the optical SWs 500-1 and 500-2, a path between an input port and an output port is connected such that optical signals being transmitted between the subscriber devices 200-1 to 200-3 and the subscriber devices 300-1 to 300-3 are output to designated optical transmission lines. AMCC signals superimposed on main signals by the subscriber devices 200-1 to 200-3 are acquired by the monitoring circuits **400*b*-1 to 400*b*-3**.

FIG. 14 is a diagram illustrating a specific configuration of the monitoring circuits **400*b*-1 to 400*b*-3. The monitoring circuits 400*b* include a wavelength demultiplexer 430, a plurality of PDs 410-1 to 410-3, and a plurality of LPFs 420-1 to 420-3. Here, the PD 410-1 receives optical signals output from a port for the wavelength λ1, the PD 410-2 receives optical signals output from a port for the wavelength λ2, and the PD 410-3 receives optical signals output from a port for the wavelength λ3. The wavelength demultiplexer 430 demultiplexes input optical signals into individual wavelengths, and outputs the optical signals from the corresponding ports for the wavelengths. The PDs 410-1 to 410-3 convert the optical signals output from the wavelength demultiplexer 430 into electrical signals. The LPFs 420-1 to 420-3** separate the AMCC signals from the electrical signals. Thus, the AMCC signals superimposed on the optical signals of the individual wavelengths can be acquired.

CITATION LIST

Non Patent Literature

Non Patent Literature 1: "ITU-T G.989.2 Recommendation, "40-Gigabit-capable-passive optical networks (NG-PON2): Physical media dependent (PMD)) layer specification," February 2019.

Non Patent Literature 2: Y. Luo. H. Roberts, K. Grobe, M. Valvo. D. Nesset, K. Asaka, H. Rohde, J. Smith, J. S. Wey, and F. Effenberger, "Physical Layer Aspects of NG-PON2 Standards-Part 2: System Design and Technology Feasibility," J. Opt. Com-mun. Netw., 8(1), pp. 43-52, January 2016.

SUMMARY OF INVENTION

Technical Problem

For the purpose of monitoring all AMCC signals in an optical access system that uses a plurality of optical transmission lines for communication of signals of a plurality of wavelengths, the monitoring circuits **400*b* of the same number as the optical transmission lines are required as illustrated in FIG. 13. Furthermore, as illustrated in FIG. 14, each of the monitoring circuits 400*b* is required to include combinations of the PD 410 and the LPF 420, the number of combinations being the same as the number of wavelengths. Therefore, the required number of combinations of the PD 410 and the LPF 420 is the same as the number obtained by multiplying the number of optical transmission lines by the number of wavelengths, and the required number of combinations of the PD 410 and the LPF 420** is larger than the number of subscriber device pairs that perform communication. Thus, in an optical access system that uses a plurality of optical transmission lines for communication, a method for monitoring a large number of AMCC signals with fewer components is desired.

In view of the above circumstances, it is an object of the present invention to provide a technology that allows for monitoring a large number of management control signals with fewer components in an optical access system that uses a plurality of optical transmission lines for communication.

Solution to Problem

One aspect of the present invention provides an optical access system that performs communication using an optical signal in which a management control signal used for management and control is superimposed in a plurality of transmission lines connecting a plurality of subscriber devices, in which the plurality of subscriber devices generates a plurality of optical signals by superimposing the management control signals of different frequencies on main signals of different wavelengths, and transmits the plurality of optical signals that has been generated, and the optical access system includes a monitoring unit that receives the plurality of optical signals transmitted from the plurality of corresponding subscriber devices, and acquires a plurality of management control signals of different frequencies from the plurality of corresponding optical signals that has been received.

One aspect of the present invention provides a monitoring method in an optical access system that performs communication using an optical signal in which a management control signal used for management and control is superimposed in a plurality of transmission lines connecting a plurality of subscriber devices, the monitoring method including: generating, by the plurality of subscriber devices, a plurality of optical signals by superimposing the management control signals of different frequencies on main signals of different wavelengths, and transmitting the plurality of optical signals that has been generated, and receiving, by a monitoring unit that acquires a management control signal from an optical signal, the plurality of optical signals transmitted from the plurality of corresponding subscriber devices, and acquiring a plurality of management control signals of different frequencies from the plurality of corresponding received optical signals.

Advantageous Effects of Invention

According to the present invention, it is possible to monitor a large number of management control signals with fewer components in an optical access system that uses a plurality of optical transmission lines for communication.

DESCRIPTION OF EMBODIMENTS

Hereinafter, an embodiment of the present invention will be described with reference to the drawings.

First Embodiment

Figure 1:
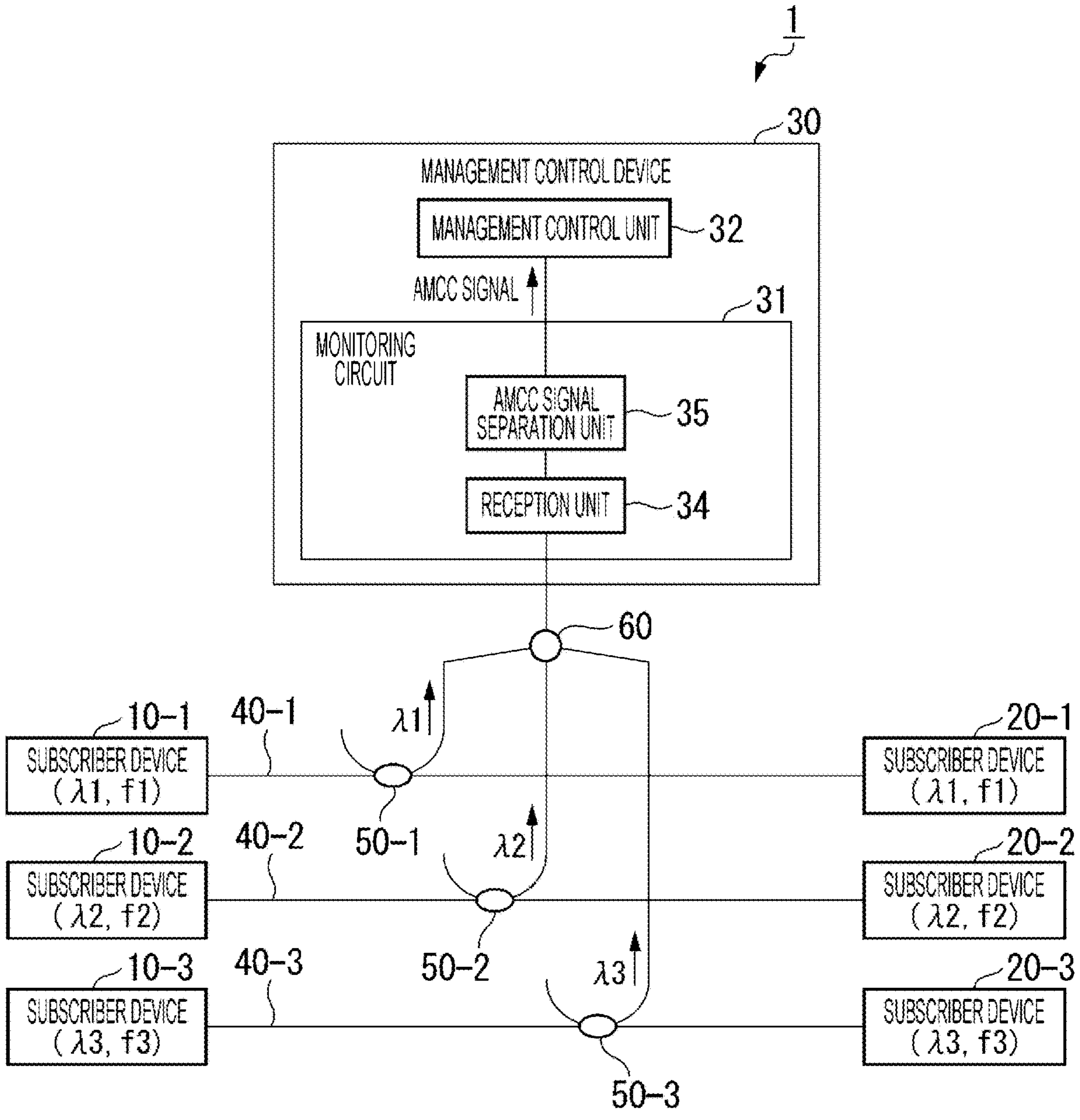
FIG. 1 is a diagram illustrating a configuration example of an optical access system according to a first embodiment.

FIG. 1 is a diagram illustrating a configuration example of an optical access system 1 according to a first embodiment. The optical access system 1 includes a plurality of subscriber devices 10-1 to 10-3, a plurality of subscriber devices 20-1 to 20-3, a management control device 30, a plurality of power splitters 50-1 to 50-3, and an optical coupler 60.

In FIG. 1, the subscriber device 10-1 and the subscriber device 20-1 are connected via an optical transmission line 40-1. The subscriber device 10-2 and the subscriber device 20-2 are connected via an optical transmission line 40-2. The subscriber device 10-3 and the subscriber device 20-3 are connected via an optical transmission line 40-3. The optical transmission lines 40 are, for example, optical fibers.

Although there is an exception, the following description shows an example of a case where the number of the subscriber devices 10 and the number of the subscriber devices 20 are three, but the numbers of the subscriber devices 10 and 20 are only required to be two or more. The optical transmission lines 40-*n* (n is an integer of 1 or more) are provided with the power splitters 50-*n*. That is, each optical transmission line 40-*n* is provided with a power splitter 50-*n*.

The subscriber device 10-*n* transmits an optical signal of a wavelength λn to the optical transmission line 40-*n*. For example, the subscriber device 10-*n* transmits, to the optical transmission line 40-*n*, the optical signal of the wavelength λn in which an AMCC signal of a frequency fin is superimposed on a main signal. Note that the subscriber devices 10-*n* are different in wavelength of the main signal, and different in frequency of the AMCC signal.

The following description is based on an assumption that the subscriber device 10-1 transmits, to the optical transmission line 40-1, an optical signal of a wavelength λ1 in which an AMCC signal of a frequency f1 is superimposed on a main signal, the subscriber device 10-2 transmits, to the optical transmission line 40-2, an optical signal of a wavelength λ2 in which an AMCC signal of a frequency f2 is superimposed on a main signal, and the subscriber device 10-3 transmits, to the optical transmission line 40-3, an optical signal of a wavelength λ3 in which an AMCC signal of a frequency f3 is superimposed on a main signal.

The subscriber device 20-*n* receives an optical signal transmitted from the subscriber device 10-*n*. For example, the subscriber device 20-*n* receives, via the optical transmission line 40-*n*, an optical signal of the wavelength λn in which an AMCC signal of a frequency fin is superimposed on a main signal. The subscriber device 20-*n* has a configuration capable of separating an AMCC signal that has been superimposed by a superimposition method of the subscriber device 10-*n*.

The management control device 30 monitors AMCC signals and performs control based on the AMCC signals. The management control device 30 includes a monitoring circuit (monitor) 31 and a management control unit 32. The monitoring circuit 31 includes a single reception unit (single receiver) 34 and a single AMCC signal separation unit (management control signal separator) 35.

The reception unit 34 converts an optical signal output from the optical coupler 60 into an electrical signal. The reception unit 34 includes a PD.

The AMCC signal separation unit 35 separates an AMCC signal from an electrical signal converted by the reception unit 34. For example, the AMCC signal separation unit 35 separates a plurality of AMCC signals of different frequencies from electrical signals converted by the reception unit 34. A specific configuration of the AMCC signal separation unit 35 will be described with reference to FIG. 4.

The management control unit 32 receives AMCC signals separated by the AMCC signal separation unit 35, and manages transmitting/receiving wavelengths and the like of the subscriber devices 10-*n* and 20-*n* on the basis of the input AMCC signals.

The power splitter 50-*n* splits optical signals being transmitted through the optical transmission line 40-*n* into a first path toward the optical coupler 60 and a second path toward the subscriber device 20-*n*. Optical signals of the wavelength λn split by the power splitter 50-*n* are input to the optical coupler 60 and the subscriber device 20-*n*.

The optical coupler 60 is an n input 1 output terminal. The optical coupler 60 receives the optical signals split by the power splitter 50-*n*, and outputs the optical signal to the management control device 30 via an optical fiber. In the example illustrated in FIG. 1, a plurality of optical signals split by the power splitters 50-1 to 50-3 is input to the optical coupler 60. The optical coupler 60 multiplexes and outputs the input optical signals to the management control device 30.

Figure 2:
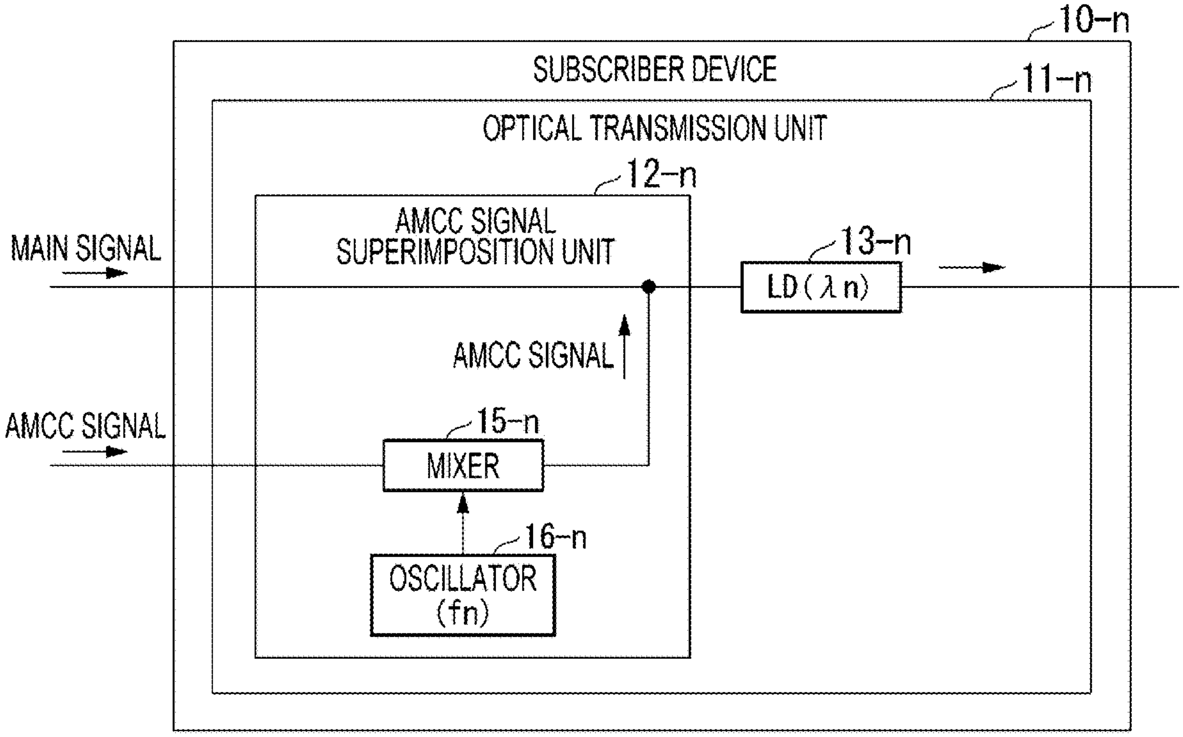
FIG. 2 is a diagram illustrating a configuration of a subscriber device according to the first embodiment.

FIG. 2 is a diagram illustrating a configuration of the subscriber device 10-*n* according to the first embodiment. The configuration illustrated in FIG. 2 is a configuration in a case where an AMCC signal is superimposed on a main signal in the electrical domain. The subscriber device 10-*n* includes an optical transmission unit 11-*n*. FIG. 2 illustrates a characteristic configuration of the subscriber device 10-*n*, and only the optical transmission unit 11-*n* is illustrated. The optical transmission unit 11-*n* includes an AMCC signal superimposition unit 12-*n* and an LD 13-*n*. The AMCC signal superimposition unit 12-*n* includes a mixer 15-*n* and an oscillator 16-*n*.

The AMCC signal superimposition unit 12-*n* up-converts an AMCC signal, which is a low-frequency signal input from the outside, to the frequency fn by using the mixer 15-*n* and the oscillator 16-*n*. The AMCC signal superimposition unit 12-*n* superimposes, in the electrical domain, the AMCC signal up-converted to the frequency fn on a main signal input from the outside.

The LD 13-*n* outputs light of the wavelength λn. The LD 13-*n* converts an electrical signal of the main signal on which the AMCC signal has been superimposed in the electrical domain into an optical signal of the wavelength λn, and outputs the optical signal.

In a case where optical signals of two or more wavelengths are received by the same optical receiver (for example, the reception unit 34 of the monitoring circuit 31), an interference component called optical beat noise is generated, centered on a frequency corresponding to a wavelength (frequency) difference of the optical signals. In a case where wavelength spacing between wavelength multiplexed signals has not been set such that the optical beat noise is outside a reception band of the optical receiver, for example, in a case where the wavelength spacing between the wavelength multiplexed signals is too narrow, received signals are deteriorated due to the optical beat noise between the main signals, and thus, the AMCC signals cannot be correctly received. Thus, in the subscriber device 10-*n* in the present specification, it is necessary to set the wavelength spacing such that the optical beat noise is outside the reception band of the optical receiver.

Figure 3:
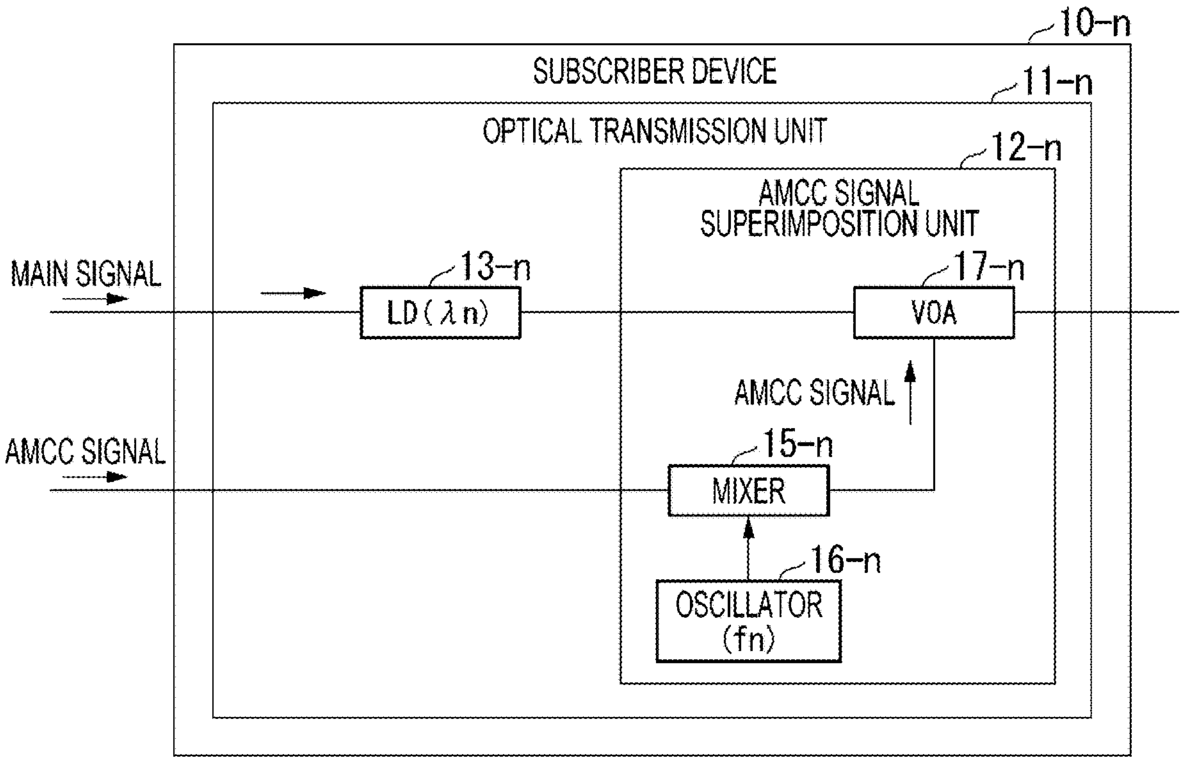
FIG. 3 is a diagram illustrating another configuration of the subscriber device according to the first embodiment.

FIG. 3 is a diagram illustrating another configuration of the subscriber device 10-*n* according to the first embodiment. The configuration illustrated in FIG. 3 is a configuration in a case where an AMCC signal is superimposed on a main signal in an optical domain. The subscriber device 10-*n* includes the optical transmission unit 11-*n*. FIG. 3 illustrates a characteristic configuration of the subscriber device 10-*n*, and only the optical transmission unit 11-*n* is illustrated. The optical transmission unit 11-*n* includes the AMCC signal superimposition unit 12-*n* and the LD 13-*n*. The AMCC signal superimposition unit 12-*n* includes the mixer 15-*n*, the oscillator 16-*n*, and a variable optical attenuator (VOA) 17-*n*.

The subscriber device 10-*n* converts an electrical signal of a main signal input from the outside into an optical signal by the LD 13-*n*. The AMCC signal superimposition unit 12-*n* up-converts an AMCC signal, which is a low-frequency signal input from the outside, to the frequency fn by using the mixer 15-*n* and the oscillator 16-*n*. The AMCC signal superimposition unit 12-*n* uses the VOA 17-*n* to superimpose the AMCC signal up-converted to the frequency fn on the optical signal in the optical domain.

Figure 4:
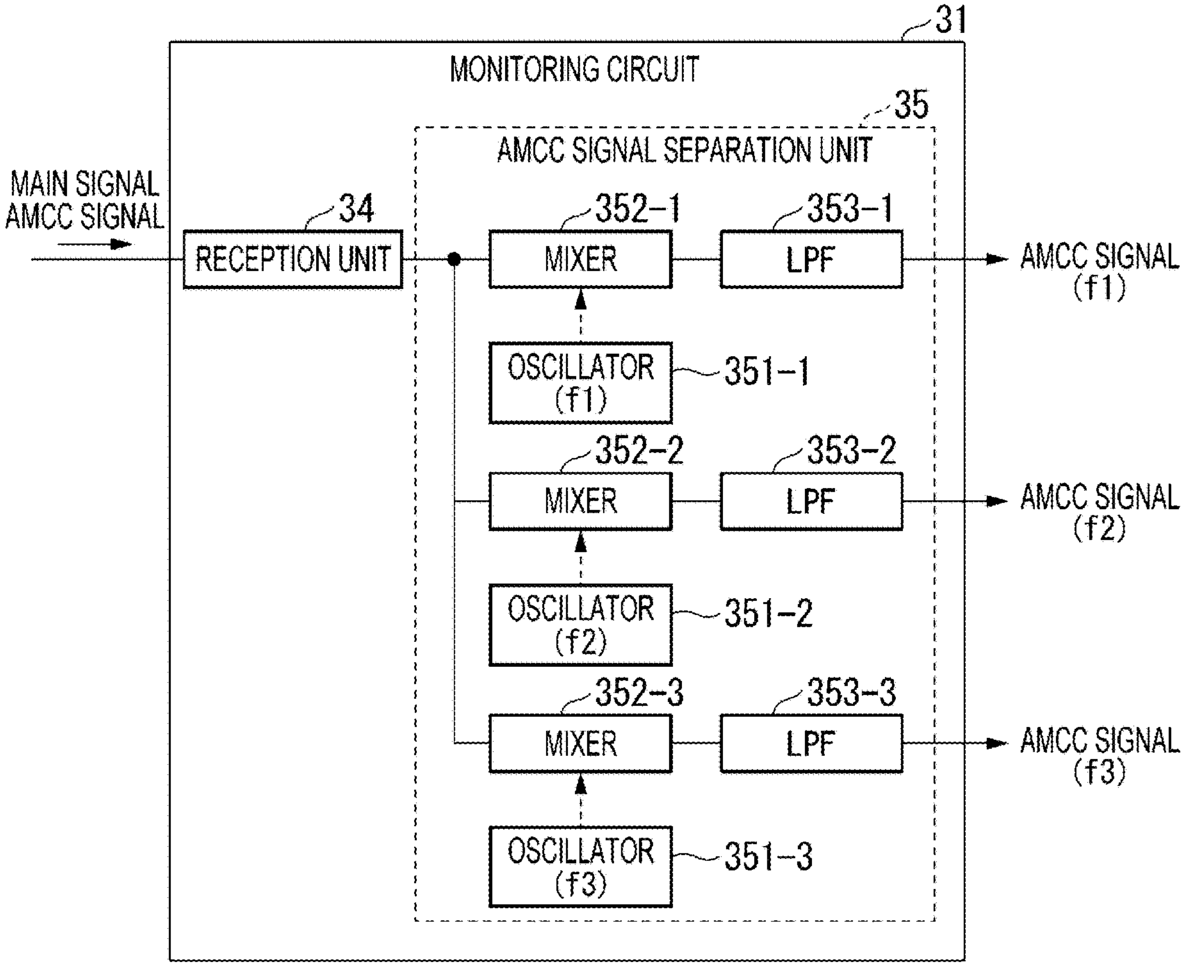
FIG. 4 is a diagram illustrating a configuration of a monitoring circuit according to the first embodiment.

FIG. 4 is a diagram illustrating a configuration of the monitoring circuit 31 according to the first embodiment. The monitoring circuit 31 includes the reception unit 34 and the AMCC signal separation unit 35. The reception unit 34 converts an input optical signal into an electrical signal.

The AMCC signal separation unit 35 includes oscillators 351-*n*, mixers 352-*n*, and LPFs 353-*n* of the same number as the number of types of frequencies of input AMCC signals. FIG. 4 illustrates a configuration in which the AMCC signal separation unit 35 includes three oscillators 351, three mixers 352, and three LPFs 353, The AMCC signal separation unit 35 down-converts an input electrical signal by using the mixer 352-*n* and the oscillator 351-*n* set to the frequency fn. Thereafter, the AMCC signal separation unit 35 extracts an AMCC signal from the down-converted electrical signal by the LPF 353-*n*.

For example, in a case where an oscillator 351-1 is set to the frequency f1, a beat component between the frequency f1 of the oscillator 351-1 and the frequency f2 included in the electrical signal and a beat component between the frequency f1 of the oscillator 351-1 and the frequency f3 included in the electrical signal are gradually reduced by an LPF 353-1.

Figure 5:
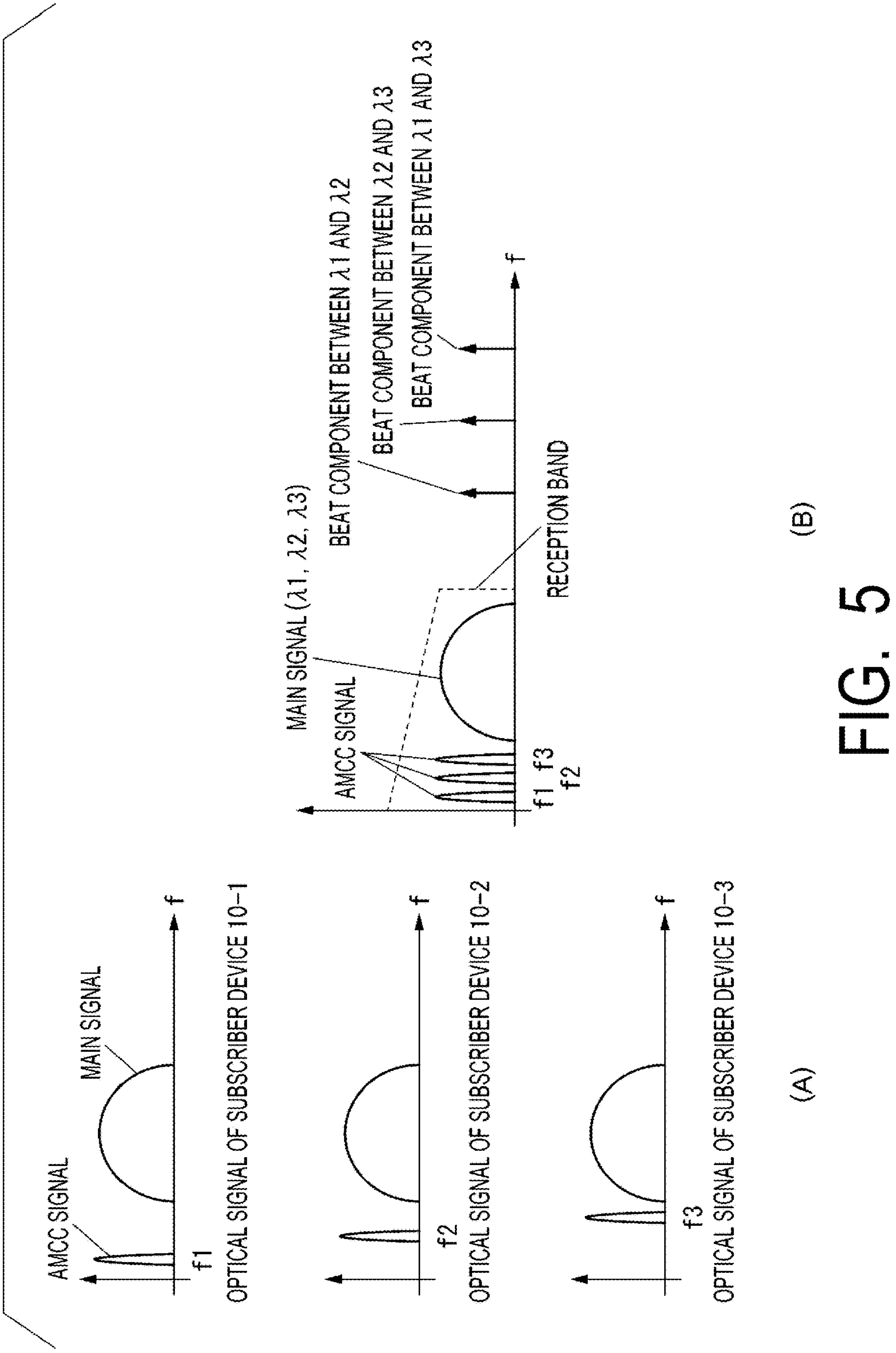
FIG. 5 is a diagram for illustrating an optical signal transmitted from a subscriber device **10-*n*** and an optical signal received by the monitoring circuit.

FIG. 5 is a diagram for describing optical signals transmitted from the subscriber devices 10-*n* and optical signals received by the monitoring circuit. The subscriber devices 10-*n* up-convert AMCC signals to frequency components fn that are different for each subscriber device 10-*n*, and then superimpose the AMCC signals of the frequencies fn on main signals of different wavelengths kn and transmit the superimposed signals. FIG. 5(A) is a diagram illustrating a frequency relationship between a main signal and an AMCC signal in an optical signal transmitted by each subscriber device 10-*n*. FIG. 5(A) illustrates that the AMCC signals have frequency components that are different for each subscriber device 10-*n*.

FIG. 5(B) is a diagram illustrating a frequency relationship between a main signal and an AMCC signal in an optical signal received by the monitoring circuit 31. The monitoring circuit 31 on the reception side collectively receives a plurality of wavelengths, and then down-converts and extracts only a designated frequency component. The monitoring circuit 31 on the reception side collectively receives a plurality of wavelengths, but this does not affect the received signals because the beat components between the main signals are outside the reception band of the optical receiver as illustrated in FIG. 5(B). It is therefore possible to receive AMCC signals transmitted by a plurality of the subscriber devices 10-*n* with one PD, and the monitoring circuit can be configured economically.

Figure 6:
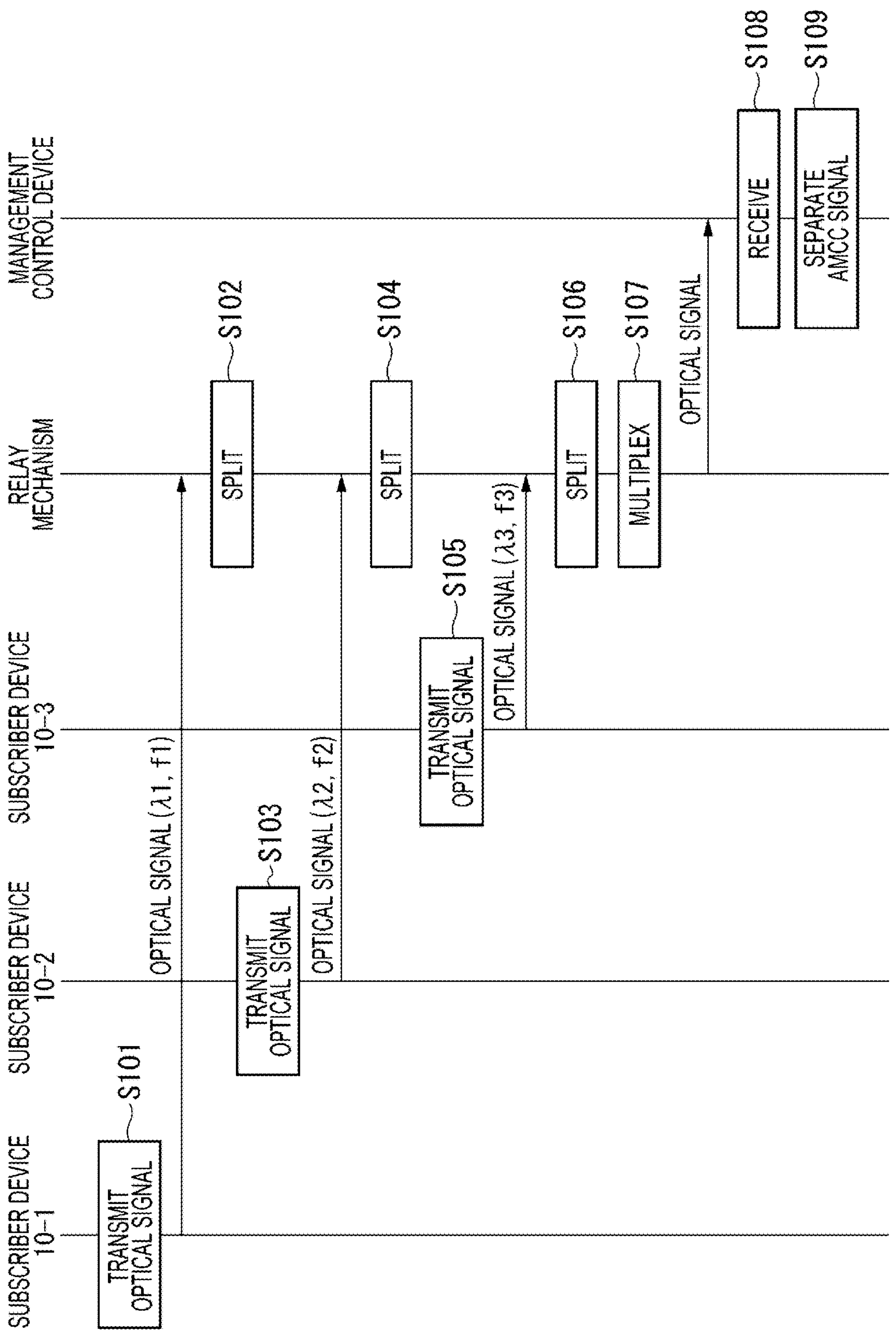
FIG. 6 is a sequence diagram illustrating a processing flow of an optical access system 1 according to the first embodiment.

FIG. 6 is a sequence diagram illustrating a processing flow of the optical access system 1 according to the first embodiment. In FIG. 2, the power splitters 50-1 to 50-3 and the optical coupler 60 are described as a relay mechanism.

The subscriber device 10-1 transmits an optical signal of the wavelength λ1 to the optical transmission line 40-1 (step S101). Specifically, the subscriber device 10-1 transmits, to the optical transmission line 40-1, an optical signal of the wavelength λ1 generated by superimposing an AMCC signal up-converted to the frequency f1 on a main signal. The optical signal transmitted from the subscriber device 10-1 is input to the power splitter 50-1 via the optical transmission line 40-1.

The power splitter 50-1 splits the input optical signal of the wavelength λ1 into the first path and the second path (step S102). Thus, the optical signal of the wavelength λ1 is input to the optical coupler 60.

The subscriber device 10-2 transmits an optical signal of the wavelength λ2 to the optical transmission line 40-2 (step S103). Specifically, the subscriber device 10-2 transmits, to the optical transmission line 40-2, an optical signal of the wavelength 2 generated by superimposing an AMCC signal up-converted to the frequency f1 on a main signal. The optical signal transmitted from the subscriber device 10-2 is input to the power splitter 50-2 via the optical transmission line 40-2.

The power splitter 50-2 splits the input optical signal of the wavelength λ2 into the first path and the second path (step S104). Thus, the optical signal of the wavelength λ2 is input to the optical coupler 60.

The subscriber device 10-3 transmits an optical signal of the wavelength λ3 to the optical transmission line 40-3 (step S105). Specifically, the subscriber device 10-3 transmits, to the optical transmission line 40-3, an optical signal of the wavelength λ3 generated by superimposing an AMCC signal up-converted to the frequency f3 on a main signal. The optical signal transmitted from the subscriber device 10-3 is input to the power splitter 50-3 via the optical transmission line 40-3.

The power splitter 50-3 splits the input optical signal of the wavelength λ3 into the first path and the second path (step S106). Thus, the optical signal of the wavelength λ3 is input to the optical coupler 60.

In FIG. 6, the pieces of processing in steps S101, S103, and S105 may be performed at the same timing or may be performed at different timings. In a case where the pieces of processing are performed at the same timing, a plurality of optical signals is input to the optical coupler 60. The description here is based on the assumption that a plurality of optical signals has been input to the optical coupler 60. The optical coupler 60 multiplexes and outputs the plurality of input optical signals to the management control device 30 (step S107).

The monitoring circuit 31 of the management control device 30 converts the input optical signals into electrical signals by the reception unit 34 (step S108). The reception unit 34 outputs the converted electrical signals to the AMCC signal separation unit 35. The AMCC signal separation unit 35 separates AMCC signals from the input electrical signals (step S109).

Specifically, the electrical signals input to the AMCC signal separation unit 35 are input to mixers 352-1, 352-2, and 352-3. The electrical signal input to the mixer 352-1 is down-converted by the oscillator 351-1 set to the frequency f1. The down-converted electrical signal is input to the LPF 353-1, and an AMCC signal of the frequency f1 is extracted.

The electrical signal input to the mixer 352-2 is down-converted by an oscillator 351-2 set to the frequency f2. The down-converted electrical signal is input to an LPF 353-2, and an AMCC signal of the frequency f2 is extracted.

The electrical signal input to the mixer 352-3 is down-converted by an oscillator 351-3 set to the frequency f3. The down-converted electrical signal is input to an LPF 353-3, and an AMCC signal of the frequency f3 is extracted.

According to the optical access system 1 configured as described above, the subscriber devices 10 transmit optical signals of different wavelengths in which AMCC signals of different frequencies are superimposed on main signals. The subscriber devices 10 use wavelengths with wavelength spacing at which the optical beat noise between the main signals is outside the reception band of the reception unit 34 of the monitoring circuit 31. The power splitters 50-*n* for splitting optical signals are provided, one for each one of the plurality of optical transmission lines 40-*n*, and the optical signals split by the power splitters 50-*n* are multiplexed by the optical coupler 60.

As described above, with the use of the optical coupler 60 provided between the monitoring circuit 31 and the power splitter 50-*n* provided in each one of the plurality of optical transmission lines 40-*n*, optical signals of a plurality of different wavelengths are combined into an optical signal and then input to the monitoring circuit 31 via one optical fiber. In the monitoring circuit 31, one reception unit 34 receives multiplexed optical signals, and converts the received optical signals into electrical signals. Thereafter, in the monitoring circuit 31, the convened electrical signals are input to a plurality of the mixers 352 and down-converted to different frequencies, and then the LPFs 353 separate AMCC signals of the designated frequencies from the electrical signals. Furthermore, the reception unit 34 collectively receives a plurality of wavelengths, but this does not affect the received signals because the optical beat noise between the main signals is outside the reception band of the reception unit 34 of the monitoring circuit 31. Therefore, optical signals of different wavelengths transmitted through different optical transmission lines 40-*n* can be multiplexed by the optical coupler 60 and input to a monitoring circuit, and it is not necessary to provide a monitoring circuit for each optical transmission line as in conventional arts. Thus, the number of monitoring circuits 31 can be reduced. That is, the number of LPFs and the number of PDs can be reduced. Thus, it is possible to monitor a large number of control signals with fewer components in an optical access system that uses a plurality of optical transmission lines for communication. Furthermore, it is possible to receive AMCC signals transmitted from the plurality of subscriber devices 10 with one reception unit 34, and the monitoring circuit 31 can be configured economically.

Modifications of First Embodiment

The above example shows a configuration in which optical signals are transmitted from the subscriber device 10-*n* to the subscriber device 20-*n*. The present invention may also be applied to a case where the subscriber device 10-*n* and the subscriber device 20-*n* perform bidirectional communication. In this case, two configurations are conceivable as the configuration of the monitoring circuit 31. First, the subscriber device 20-*n* outputs optical signals of a wavelength λd-n, and the subscriber device 10-*n* receives optical signals of the wavelength λd-n. AMCC signals to be superimposed by the subscriber device 20-*n* are up-converted to fd-n. The subscriber device 10-*n* and the subscriber device 20-*n* use different wavelengths, and the AMCC signals are up-converted to different frequencies.

A first configuration of the monitoring circuit 31 additionally includes a monitoring circuit connected to an unused port of the power splitters 50 so as to receive an optical signal transmitted from the subscriber device 20-*n*. The monitoring circuit additionally provided has a configuration similar to that of the monitoring circuit 31. Thus, the monitoring circuit that has received an optical signal transmitted from the subscriber device 20-*n* may perform processing similar to that of the monitoring circuit 31.

A second configuration of the monitoring circuit 31 includes the optical coupler 60 in which the number of splits is doubled, in which an unused port of the power splitters 50 is connected to the optical coupler 60, and optical signals output by the subscriber devices 10-*n* and optical signals output by the subscriber devices 20-*n* are received by the same monitoring circuit 31 at a time.

Figure 7:
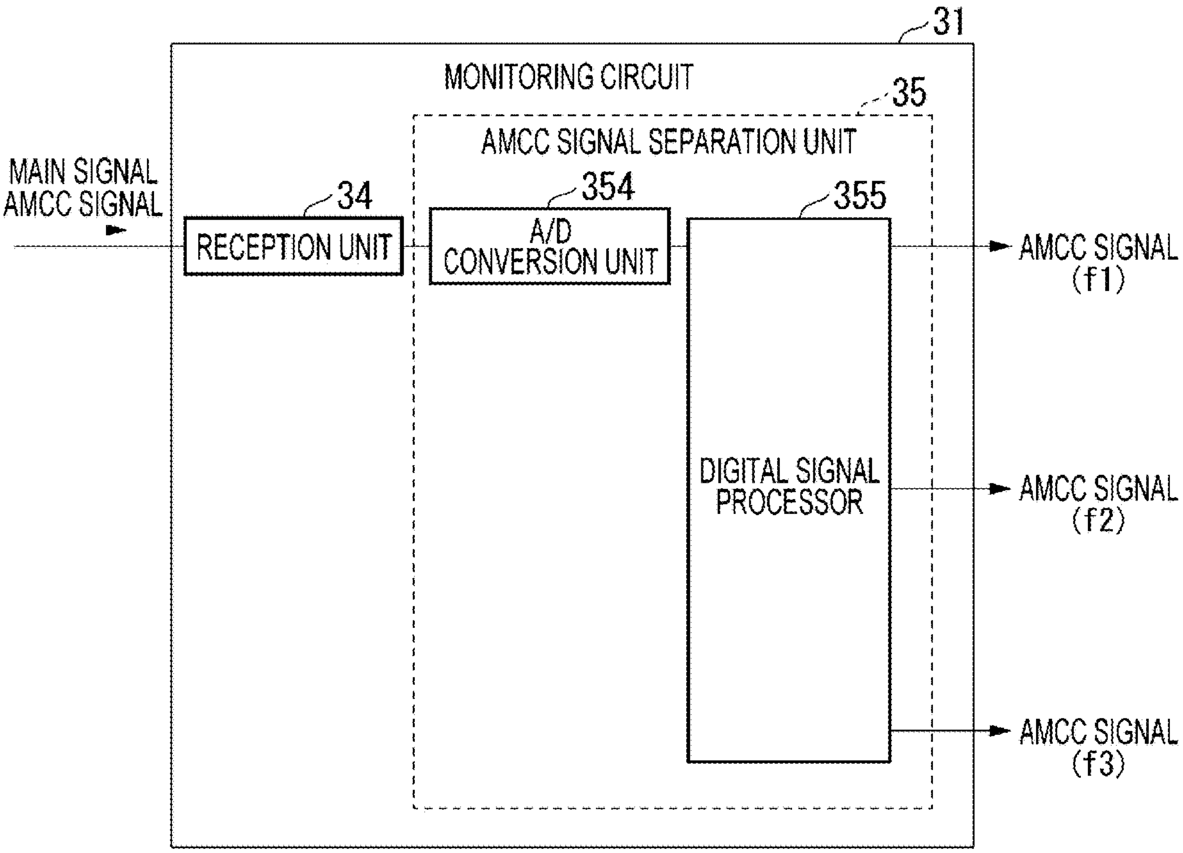
FIG. 7 is a diagram illustrating another configuration of the monitoring circuit according to the first embodiment.

The configuration of the monitoring circuit 31 illustrated in FIG. 4 may also be a configuration using a digital signal processor (DSP) as illustrated in FIG. 7. FIG. 7 is a diagram illustrating another configuration of the monitoring circuit 31 according to the first embodiment. The monitoring circuit 31 illustrated in FIG. 7 includes the reception unit 34 and the AMCC signal separation unit 35.

The AMCC signal separation unit 35 includes an analog-digital (A/D) conversion unit 354 and a digital signal processor 355. The A/D conversion unit 354 converts an analog electrical signal into a digital electrical signal. The digital signal processor 355 implements, for example, the function of the AMCC signal separation unit 35 in FIG. 4 to separate and acquire an AMCC signal.

Second Embodiment

A second embodiment describes a configuration in which, in addition to the configuration of the first embodiment, a plurality of optical SWs and a plurality of optical multiplexers/demultiplexers are provided between opposing subscriber devices, and optical signals of different wavelengths on which AMCC signals of different frequencies are superimposed are transmitted through one optical transmission line.

Figure 8:
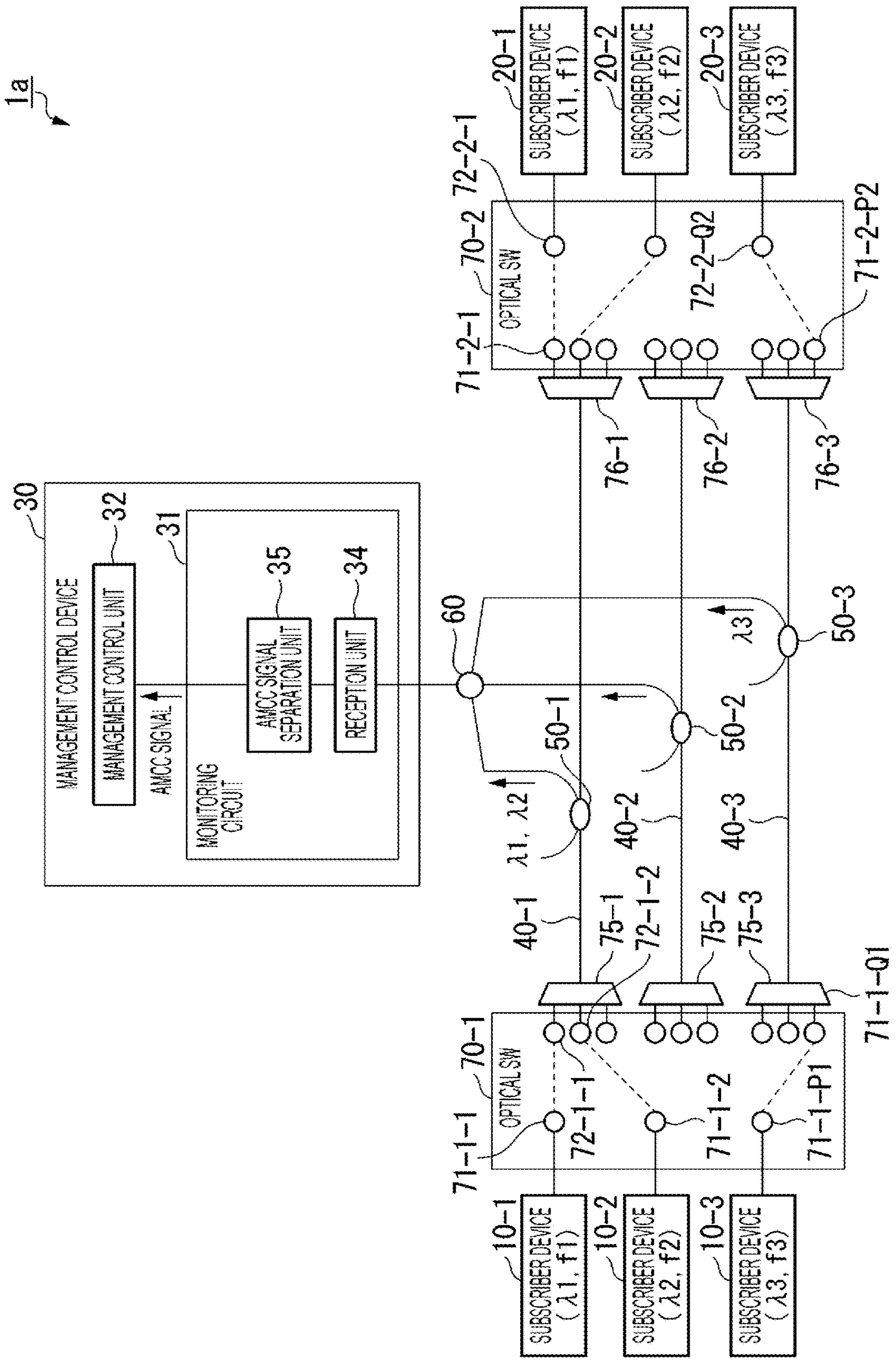
FIG. 8 is a diagram illustrating a configuration example of an optical access system according to a second embodiment.

FIG. 8 is a diagram illustrating a configuration example of an optical access system 1*a* according to the second embodiment. The optical access system 1*a* includes a plurality of subscriber devices 10-1 to 10-3, a plurality of subscriber devices 20-1 to 20-3, a management control device 30, a plurality of power splitters 50-1 to 50-3, an optical coupler 60, a plurality of optical SWs 70-1 and 70-2, and a plurality of optical multiplexers/demultiplexers 75-1 to 75-3 and 76-1 to 76-3. The optical multiplexers/demultiplexers 75-1 to 75-3 and 76-1 to 76-3 may be, for example, arrayed waveguide gratings (1×N AWGs), and receive optical signals of different wavelengths and then output the optical signals from a single port, or receive optical signals of different wavelengths from a single port and then output each of the optical signals from a port corresponding to the wavelength of the optical signal.

The optical access system 1*a* is different from the optical access system 1 in that the optical SWs 70-1 and 70-2 and the optical multiplexers/demultiplexers 75-1 to 75-3 and 76-1 to 76-3 are further included. Other components of the optical access system 1*a* are similar to those of the optical access system 1. Thus, differences from the optical access system 1 will be mainly described below.

The optical SW 70-1 has ports 71-1-1 to 71-1-P1 (P1 is an integer of 2 or more) and ports 72-1-1 to 72-1-Q1 (Q1 is an integer of 2 or more). An unspecified one among the ports 71-1-1 to 71-1-P1 is referred to as the port 71-1, and the ports 71-1-1 to 71-1-P1 are collectively referred to as the ports 71-1. An unspecified one among the ports 72-1-1 to 72-1-Q1 is referred to as the port 72-1, and the ports 72-1-1 to 72-1-Q1 are collectively referred to as the ports 72-1.

The plurality of subscriber devices 10-1 to 10-3 is connected to the ports 71-1 of the optical SW 70.1 by optical transmission lines, and the plurality of optical multiplexers/demultiplexers 75-1 to 75-3 is connected to the ports 72-1 of the optical SW 70-1 by optical transmission lines. An optical signal input to a certain port of the optical SW 70-1 is output from another port.

The optical SW 70-2 has ports 71-2-1 to 71-2-P2 (P2 is an integer of 2 or more) and ports 72-2-1 to 72-2-Q2 (Q2 is an integer of 2 or more). An unspecified one among the ports 71-2-1 to 71-2-P2 is referred to as the port 71-2, and the ports 71-2-1 to 71-2-P2 am collectively referred to as the ports 71-2. An unspecified one among the ports 72-2-1 to 72-2-Q2 is referred to as the port 72-2, and the ports 72-2-1 to 72-2-Q2 are collectively referred to as the ports 72-2.

A plurality of the optical multiplexers/demultiplexers 76-1 to 76-3 is connected to the ports 71-2 of the optical SW 70-2 by optical transmission lines, and the plurality of subscriber devices 20-1 to 20-3 is connected to the ports 72-2 of the optical SW 70-2 by optical transmission lines. An optical signal input to a certain port of the optical SW 70-2 is output from another port.

The optical multiplexers/demultiplexers 75-*n* and 76-*n* multiplex or demultiplex input optical signals. The optical multiplexer/demultiplexer 75-*n* is provided between the optical SW 70-1 and an optical transmission line 40-*n*. The optical multiplexer/demultiplexer 76-*n* is provided between the optical SW 70-2 and the optical transmission line 40-*n*. The optical multiplexers/demultiplexers 75-*n* and 76-*n* are provided for each optical transmission line 40, for example.

The optical multiplexer/demultiplexer 75-*n* has a plurality of ports (three ports in FIG. 8, in which optical signals of wavelengths λ1, λ2, and λ3 are respectively input to the ports from above) in accordance with the number of wavelengths used by the subscriber devices 10, and the plurality of ports is connected to the ports 72-1 of the optical SW 70-1. The optical multiplexer/demultiplexer 76-*n* has a plurality of ports (three ports in FIG. 8, in which optical signals of the wavelengths λ1, λ2, and λ3 are respectively input to the ports from above) in accordance with the number of wavelengths used by the subscriber devices 20, and the plurality of ports is connected to the ports 71-2 of the optical SW 70-2.

Next, a processing flow of the optical access system 1*a* according to the second embodiment will be described.

The subscriber devices 10-1 to 10-3 transmit optical signals of different wavelengths. Specifically, the subscriber device 10-1 transmits, to an optical transmission line 40-1, an optical signal of the wavelength λ1 generated by superimposing an AMCC signal up-converted to a frequency f1 on a main signal, the subscriber device 10-2 transmits, to an optical transmission line 40-2, an optical signal of the wavelength λ2 generated by superimposing an AMCC signal up-convened to a frequency f2 on a main signal, and the subscriber device 10-3 transmits, to an optical transmission line 40-3, an optical signal of the wavelength λ3 generated by superimposing an AMCC signal up-converted to a frequency f3 on a main signal.

The optical signals of different wavelengths transmitted front the subscriber devices 10-1 to 10-3 are input to the optical SW 70-1. For example, the optical signal of the wavelength λ1 transmitted from the subscriber device 10-1 is input to the port 71-1-1 of the optical SW 70-1. Similarly, the optical signal of the wavelength λ2 transmitted from the subscriber device 10-2 is input to the port 71-1-2 of the optical SW 70-1. Similarly, the optical signal of the wavelength λ3 transmitted from the subscriber device 10-3 is input to the port 71-1-P1 (for example, P1 is 3) of the optical SW 70-1.

It is assumed that connection relationships between the ports 71 and the ports 72 in the optical SW 70-1 are set in advance. In FIG. 8, the port 71-1-1 and the port 72-1-1 are connected, the port 71-1-2 and the port 72-1-2 are connected, and the port 71-1-P1 and the port 72-1-Q1 (for example, Q1 is 9) are connected. Thus, the optical signal of the wavelength λ1 input to the port 71-1-1 is output from the port 72-1-1, the optical signal of the wavelength 22 input to the port 71-1-2 is output from the port 72-1-2, and the optical signal of the wavelength λ3 input to the port 71-1-P1 is output from the port 72-1-Q1.

The optical multiplexer/demultiplexer 75-1 is connected to the ports 72-1-1 and 72-1-2. Thus, the optical multiplexer/demultiplexer 75-1 multiplexes the optical signal of the wavelength λ1 output from the port 72-1-1 and the optical signal of the wavelength λ2 output from the port 72-1-2, and outputs the multiplexed signal to the optical transmission line 40-1. The optical multiplexer/demultiplexer 75-3 is connected to the port 72-1-Q1. Thus, the optical multiplexer/demultiplexer 75-3 outputs, to the optical transmission line 40-3, the optical signal of the wavelength λ3 output from the port 72-1-Q1.

The optical signal output from the optical multiplexer/demultiplexer 75-1 is input to the power splitter 50-1 via the optical transmission line 40-1. The power splitter 50-1 splits the input optical signals of the wavelengths λ1 and λ2 into a first path and a second path. Thus, the optical signals of the wavelengths λ1 and λ2 are input to the optical coupler 60.

The optical signal output from the optical multiplexer/demultiplexer 75-3 is input to the power splitter 50-3 via the optical transmission line 40-3. The power splitter 50-3 splits the input optical signal of the wavelength λ3 into the first path and the second path. Thus, the optical signal of the wavelength 3 is input to the optical coupler 60. The optical coupler 60 multiplexes and outputs a plurality of input optical signals to the management control device 30. The processing performed by the management control device 30 is similar to that in the first embodiment, and description thereof will be omitted.

Instead of the optical coupler 60, a mode coupler as described in Reference Literature 1 below can also be used. In a case where the mode coupler is used, a multimode fiber is used between the mode coupler and a reception unit 34, unlike a normal single-mode fiber. By using the mode coupler instead of the optical coupler 60 as described above, it is possible to increase the intensity of the optical signal received by the reception unit 34.

(Reference Literature 1: Masamichi Fujiwara, Ken-Ichi Suzuki. Naoto Yoshimoto, Manabu Oguma, and Shunichi Sonia, "Increasing Splitting Ratio of 10 Gb/s-Class PONs by Using FW-DMF that Acts as Low Loss Splitter for Upstream and Conventional Splitter for Downstream", OFC, Tu2C, 2014.)

The optical signal split into the second path by the power splitter 50-1 is input to the optical multiplexer/demultiplexer 76-1. The optical multiplexer/demultiplexer 76-1 demultiplexes the input optical signal. The optical signal demultiplexed by the optical multiplexer/demultiplexer 76-1 is input to the port 71-2 of the optical SW 70-2. The optical signal input to the port 71-2 of the optical SW 70-2 is output from the port 72-2 connected to the port 71-2 and transferred to the subscriber device 20.

The optical signal split into the second path by the power splitter 50-3 is input to the optical multiplexer/demultiplexer 76-3. The optical multiplexer/demultiplexer 76-3 demultiplexes the input optical signal. The optical signal demultiplexed by the optical multiplexer/demultiplexer 76-3 is input to the port 71-2 of the optical SW 70-2. The optical signal input to the port 71-2 of the optical SW 70-2 is output from the port 72-2 connected to the port 71-2 and transferred to the subscriber device 20.

According to the optical access system 1*a* configured as described above, effects similar to those of the first embodiment can be obtained.

Furthermore, in the optical access system 1*a*, the optical SWs 70-1 and 70-2 are provided in the optical transmission lines 40 connecting the subscriber devices 10 and the subscriber devices 20. Thus, it is possible to switch between paths through which optical signals transmitted from the subscriber devices 10 are to be transmitted. Even in a case where the paths are switched by the optical SW 70-1 and optical signals of different wavelengths are transmitted through the same optical transmission line 40, the optical signals can be multiplexed by the optical coupler 60 and input to a monitoring circuit, and it is not necessary to provide a monitoring circuit for each optical transmission line as in conventional arts. Thus, the number of monitoring circuits 31 can be reduced. That is, the number of LPFs and the number of PDs can be reduced. Thus, it is possible to monitor a large number of control signals with fewer components in an optical access system that uses a plurality of optical transmission lines for communication.

Third Embodiment

The first and second embodiments show a configuration that includes three subscriber devices 10 and three subscriber devices 20, in which the subscriber devices 10 use different wavelengths and different frequencies from each other, and the subscriber devices 20 use different wavelengths and different frequencies from each other. A third embodiment describes a configuration in a case where four subscriber devices 10 and four subscriber devices 20 are included, in which some of the subscriber devices 10 and 20 overlap in wavelength frequency used.

Figure 9:
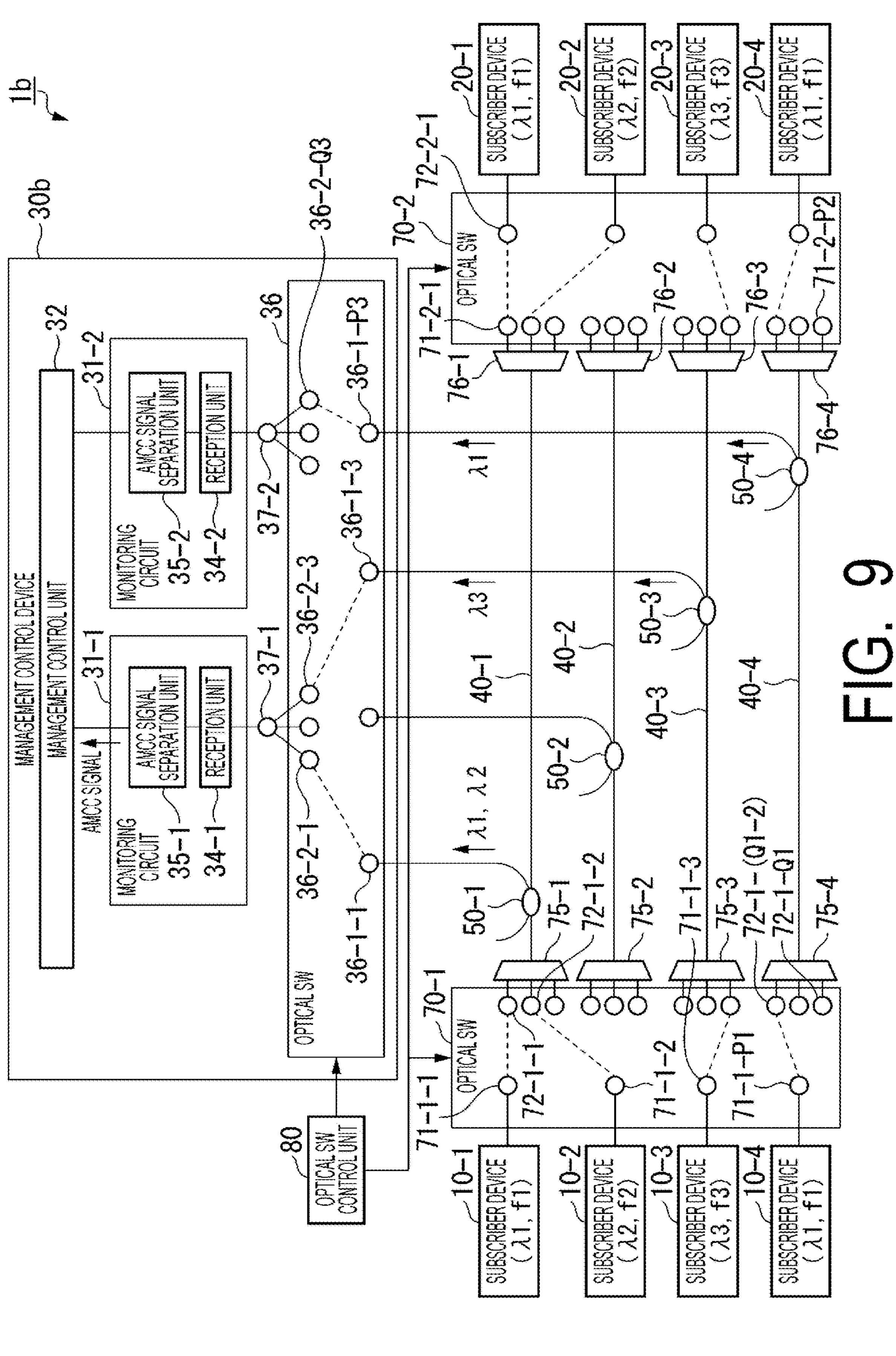
FIG. 9 is a diagram illustrating a configuration example of an optical access system according to a third embodiment.

FIG. 9 is a diagram illustrating a configuration example of an optical access system 1*b* according to the third embodiment. The optical access system 1*b* includes a plurality of subscriber devices 10-1 to 10-4, a plurality of subscriber devices 20-1 to 20-4, a management control device 30*b*, a plurality of power splitters 50-1 to 50-4, a plurality of optical SWs 70-1 and 70-2, a plurality of optical multiplexers/demultiplexers 75-1 to 75-4 and 76-1 to 76-4, and an optical SW control unit 80.

The optical access system 1*b* is different from the optical access system 1*a* in that the numbers of the subscriber devices 10, the subscriber devices 20, the power splitters 50, the optical multiplexers/demultiplexers 75, and the optical multiplexers/demultiplexers 76 are larger than those of the optical access system 1*a*, the optical coupler 60 is not included, the management control device 30*b* is included instead of the management control device 30, and the optical SW control unit 80 is newly provided. Other components of the optical access system 1*b* are similar to those of the optical access system Ia. Thus, differences from the optical access system 1*a* will be mainly described below. In a case where the subscriber devices 10, the subscriber devices 20, the power splitters 50, the optical multiplexers/demultiplexers 75, and the optical multiplexers/demultiplexers 76 remain the same in the basic processing except for the increase in quantity, description thereof will be omitted.

Unlike the first and second embodiments, the optical access system 1*b* does not include the optical coupler 60. Thus, optical signals transmitted through optical transmission lines 40 are split by the corresponding power splitters 50-1 to 50-4 and input to the management control device 30*b*.

As in the first and second embodiments, the subscriber devices 10-1 to 10-3 transmit optical signals of wavelengths λ1 to λ3 in which AMCC signals of different frequencies f1 to f3 are superimposed on main signals. In the third embodiment, in a similar manner to the subscriber device 10-1, the subscriber device 10-4 transmits, to an optical transmission line 40-4, an optical signal of the wavelength λ1 in which an AMCC signal of the frequency f1 is superimposed on a main signal, for example. Note that the subscriber device 10-4 may use any frequency and any wavelength as long as the frequency and the wavelength overlap with those of one of the other subscriber devices 10. The subscriber device 10-4 is an aspect of a second subscriber device. Furthermore, while the third embodiment shows a case where the number of the subscriber devices 10 and the number of the subscriber devices 20 are four for the sake of simplicity of description, the numbers may be five or more.

Since the subscriber device 10-1 and the subscriber device 10-4 use the same wavelength for communication, it is necessary to perform control in such a way that optical signals are transmitted through different optical transmission lines 40 so that the optical signals are prevented from being mixed. Such control is performed by the optical SW control unit 80. For example, the optical SW control unit 80 controls connection relationships between input ports and output ports in the optical SW 70-1 so that the subscriber devices 10 that use the same wavelength for communication do not transmit optical signals to the same optical transmission line 40. In the example illustrated in FIG. 9, the optical SW control unit 80 controls the connection relationships-between the input ports and the output ports in the optical SW 70-1 so that the optical signal of the wavelength λ1 transmitted from the subscriber device 10-4 is transmitted via the optical transmission line 404. The optical transmission line 40-4 is provided with the power splitter 50-4.

The subscriber devices 20-1 to 20-3 use different frequencies f1 to f3 and different wavelengths λ1 to λ3 for communication, as in the first and second embodiments. In the third embodiment, for example, in a similar manner to the subscriber device 20-1, the subscriber device 20-4 receives the optical signal of the wavelength λ1 in which the AMCC signal of the frequency f1 is superimposed on the main signal. Note that the subscriber device 20-4 may use any frequency and any wavelength as long as the frequency and the wavelength overlap with those of one of the other subscriber devices 20.

The management control device 30*b* monitors AMCC signals and performs control based on the AMCC signals. The management control device 30*b* includes a plurality of monitoring circuits 31-1 and 31-2, a management control unit 32, an optical SW 36, and a plurality of optical couplers 37-1 and 37-2.

The optical SW 36 has ports 36-1-1 to 36-1-P3 (P3 is an integer of 2 or more) and ports 36-2-1 to 36-2-Q3 (Q1 is an integer of 2 or more). An unspecified one among the ports 36-1-1 to 36-1-P3 is referred to as the port 36-1, and the ports 36-1-1 to 36-1-P3 are collectively referred to as the ports 36-1. An unspecified one among the ports 36-2-1 to 36-2-Q3 is referred to as the port 36-1, and the ports 36-2-1 to 36-2-Q3 are collectively referred to as the ports 36-1.

The power splitters 50-1 to 50-4 are connected to the ports 36-1 of the optical SW 36 by optical transmission lines, and the optical couplers 37-1 and 37-2 are connected to the ports 36-2 of the optical SW 36 by optical transmission lines. In the optical SW 36 according to the third embodiment, the optical SW control unit 80 performs control in such a way that optical signals of an overlapping wavelength are output from different ports so that the optical signals of the overlapping wavelength are not output to the same path.

For example, in the example illustrated in FIG. 9, the optical signal of the wavelength λ1 transmitted from the subscriber device 10-1 and the optical signal of the wavelength λ1 transmitted from the subscriber device 10-4 are optical signals of the same wavelength. Thus, the optical SW control unit 80 controls the connection relationships between the input ports and the output ports in the optical SW 36 so that the optical signal of the wavelength λ1 transmitted from the subscriber device 10-1 and the optical signal of the wavelength λ1 transmitted from the subscriber device 10-4 are output from different ports and input to the monitoring circuits 31-1 and 31-2 via the different optical couplers 37-1 and 37-2.

The optical couplers 37-1 and 37-2 are n input 1 output terminals. The optical coupler 37-1 is provided between the optical SW 36 and the monitoring circuit 31-1, receives optical signals output from the ports 36-2 of the optical SW 36, and multiplexes and outputs the optical signals to the monitoring circuit 31-1. The optical coupler 37-2 is provided between the optical SW 36 and the monitoring circuit 31-2, receives optical signals output from the ports 36-2 of the optical SW 36, and multiplexes and outputs the optical signals to the monitoring circuit 31-2.

Thus, even in a case where optical signals transmitted through each optical transmission line 40 are separately input to the management control device 30*b*, the optical signals are combined into one optical signal before being input to the monitoring circuits 31-1 and 31-2. The reason why the two monitoring circuits 31-1 and 31-2 are provided is to prevent optical signals of the same wavelength from being input to the same monitoring circuit 31. Thus, in a case where there are three subscriber devices 10 that transmit optical signals of the same wavelength, the management control device 30*b* is provided with three monitoring circuits 31. The monitoring circuit 31-1 is an aspect of a first monitoring unit, and the monitoring circuit 31-2 is an aspect of a second monitoring unit.

The optical SW control unit 80 controls each of the optical SWs 70-1, 70-2, and 36. The optical SW control unit 80 holds optical transmission line information and optical signal wavelength information. The optical transmission line information is information regarding the optical transmission lines through which optical signals are transmitted and received between the subscriber devices 10 and the subscriber devices 20. The optical transmission line information includes at least information for identifying an optical transmission line through which an optical signal is transmitted and received between the subscriber device 10 and the subscriber device 20, for example. The optical signal wavelength information includes information regarding the wavelengths used by the subscriber devices 10 and the subscriber devices 20.

By holding the optical transmission line information and the optical signal wavelength information, the optical SW control unit 80 can grasp an optical signal of which wavelength should be transmitted through which optical transmission line. The optical SW control unit 80 uses the optical transmission line information and the optical signal wavelength information to control the connection relationships between the input ports and the output ports in the optical SWs 70-1, 70-2, and 36. By controlling the connection relationships between the input ports and the output ports in the optical SWs 70-1 and 70-2, the optical SW control unit 80 designates the optical transmission line through which the optical signal is to be transmitted between the subscriber device 10 and the subscriber device 20.

For example, in a case where the optical transmission line information includes information that optical signals transmitted from the subscriber devices 10-1 and 10-2 are to be transmitted through an optical transmission line 40-1, and the optical signal wavelength information includes information that the subscriber devices 10-1 and 10-2 use the wavelengths λ1 and λ2, the optical SW control unit 80 controls the optical SW 70-1 so that a port 71-1-1 and a port 72-1-1 in the optical SW 70-1 are connected, and a port 71-1-2 and a port 72-1-2 in the optical SW 70-1 are connected. Thus, optical signals transmitted from the subscriber devices 10-1 and 10-2 are transmitted through the optical transmission line 40-1.

Furthermore, the optical SW control unit 80 designates the connection relationships between the input ports and the output ports in the optical SW 36, so that optical signals output from the corresponding power splitters 50-*n* are input to the optical couplers 37-1 and 37-2. That is, the optical SW control unit 80 controls the optical SW 36 so that an optical signal input from the port 36-1 of the optical SW 36 is output from the port 36-2 corresponding to a transfer destination. By designating the connection relationships between the input ports and the output ports in the optical SW 36 as described above, it is possible to select only the ports to which optical signals are to be input and establish connections to the output ports connected to the optical couplers 37-1 and 37-2.

In the third embodiment, optical signals of the same wavelength transmitted from different subscriber devices 10 are input to the management control device 30*b*. In a case where optical signals of the same wavelength transmitted from different subscriber devices 10 are input to the same reception unit 34, the AMCC signals cannot be correctly extracted. Thus, the optical SW control unit 80 controls the connection relationships between the ports 36-1 and the ports 36-2 so that optical signals of the same wavelength transmitted from different subscriber devices 10 are not input to the same reception unit 34.

Here, a description will be given on the assumption that an optical signal of the wavelength λ1 is input to the port 36-1-1 of the optical SW 36 and an optical signal of the wavelength λ1 is input to the port 36-1-P3 of the optical SW 36. The optical SW control unit 80 performs control so that the optical signal of the wavelength λ1 input to the port 36-1-1 of the optical SW 36 is output from the port 36-2-1 to which a reception unit 34-1 of the monitoring circuit 31-1 is connected, and performs control so that the optical signal of the wavelength λ1 input to the port 36-1-P3 of the optical SW 36 is output from the port 36-2-Q3 to which a reception unit 34-2 of the monitoring circuit 31-2 is connected. Specifically, the optical SW control unit 80 controls the connection relationships in the optical SW 36 so that the port 36-1-1 and the port 36-2-1 in the optical SW 36 are connected and the port 36-1-P3 and the port 36-2-Q3 in an optical SW 36-1 are connected. As a result of this switching, optical signals of the same wavelength input to the optical SW 36 are output to different output destinations.

Next, a processing flow of the optical access system 1*b* according to the third embodiment will be described. Here, it is assumed that the subscriber device 10-1 and the subscriber device 10-4 use AMCC signals of the same frequency and the same wavelength for communication. Processing in which optical signals of the same wavelength are transmitted, not the entire processing of the optical access system 1*b*, will be mainly described.

The subscriber devices 10-1 to 10-4 transmit optical signals of assigned wavelengths. The optical signal transmitted from each of the subscriber devices 10-1 to 10-4 is input to the optical SW 70-1. For example, the optical signal transmitted from the subscriber device 10-1 is input to the port 71-1-1 of the optical SW 70-1. Similarly, the optical signal transmitted from the subscriber device 10-2 is input to the port 71-1-2 of the optical SW 70-1. Similarly, the optical signal transmitted from the subscriber device 10-3 is input to a port 71-1-3 of the optical SW 70-1. Similarly, the optical signal transmitted from the subscriber device 10-4 is input to a port 71-1-P1 (for example, P1 is 4) of the optical SW 70-1.

It is assumed that the connection relationships between the ports 71 and the ports 72 in the optical SW 70-1 are set by the optical SW control unit 80 on the basis of the optical transmission line information and the optical signal wavelength information. In FIG. 9, it is assumed that the optical SW control unit 80 controls the optical SW 70-1 so that the port 71-1-1 and the port 72-1-1 are connected, the port 71-1-2 and the port 72-1-2 are connected, and the port 71-1-P1 and a port 72-1-(Q1-2) (for example, Q1 is 12) are connected. Thus, optical signals of the same wavelength transmitted front the subscriber device 10-1 and the subscriber device 10-4 are transmitted through different optical transmission lines 40.

The optical signal of the wavelength λ1 input to the port 71-1-1 is output from the port 72-1-1, the optical signal of the wavelength λ2 input to the port 71-1-2 is output from the port 72-1-2, and the optical signal of the wavelength λ1 input to the port 71-1-P1 is output from the port 72-1-(Q1-2).

The optical multiplexer/demultiplexer 75-1 is connected to the ports 72-1-1 and 72-1-2. Thus, the optical multiplexer/demultiplexer 75-1 multiplexes the optical signal of the wavelength λ1 and the optical signal of the wavelength λ2 output from the ports 72-1-1 and 72-1-2, and outputs the multiplexed signal to the optical transmission line 40-1. The optical multiplexer/demultiplexer 75-4 is connected to the port 72-1-(Q1-2). Thus, the optical multiplexer/demultiplexer 75-4 outputs, to the optical transmission line 40-4, the optical signal of the wavelength λ1 output front the port 72-1-(Q1-2).

The optical signal output from the optical multiplexer/demultiplexer 75-1 is input to the power splitter 50-1 via the optical transmission line 40-1. The power splitter 50-1 splits the input optical signals of the wavelengths λ1 and λ2 into a first path and a second path. Thus, the optical signals of the wavelengths λ1 and λ2 are input to the port 36-1-1 of the optical SW 36 of the management control device 30*b*.

The optical signal output from the optical multiplexer/demultiplexer 75-4 is input to the power splitter 50-4 via the optical transmission line 40-4. The power splitter 50-4 splits the input optical signal of the wavelength λ1 into the first path and the second path. Thus, the optical signal of the wavelength λ1 is input to the port 36-1-P3 (for example, P3 is 4) of the optical SW 36 of the management control device 30*b*.

It is assumed that the connection relationships between the ports 36-1 and the ports 36-2 in the optical SW 36 are set by the optical SW control unit 80 on the basis of the optical transmission line information and the optical signal wavelength information. In FIG. 9, the port 36-1-1 and the port 36-2-1 are connected, and the port 36-1-P3 and the port 36-2-Q3 (for example, Q3 is 6) are connected.

Thus, the optical signals of the wavelengths λ1 and λ2 input to the port 36-1-1 are output from the port 36-2-1, and the optical signal of the wavelength λ1 input to the port 36-1-P3 is output from the port 36-2-Q3.

The optical coupler 37-1 is connected to the port 36-2-1. Thus, the optical coupler 37-1 multiplexes and outputs the input optical signals to the monitoring circuit 31-1. The optical coupler 37-1 also receives an optical signal of the wavelength λ3 transmitted from the subscriber device 10-3. That is, the optical signals of the wavelengths λ1, λ2, and λ3 are input to the optical coupler 37-1.

The reception unit 34-1 of the monitoring circuit 31-1 converts the optical signals of the wavelengths λ1, λ2, and λ3 output from the optical coupler 37-1 into electrical signals. The reception unit 34-1 outputs the converted electrical signals to an AMCC signal separation unit 35-1. The AMCC signal separation unit 35-1 separates AMCC signals of the designated frequency from the input electrical signals. Thus, the AMCC signal separation unit 35-1 can acquire each AMCC signal of a frequency fn superimposed on the optical signal of a wavelength 71*n*.

The optical coupler 37-2 is connected to the port 36-2-Q3. The optical coupler 37-2 is an optical coupler different from the optical coupler to which the optical signal of the wavelength λ1 transmitted from the subscriber device 10-1 is input. Thus, optical signals of the same wavelength are not mixed. The optical coupler 37-2 multiplexes and outputs the input optical signals to the reception unit 34-2.

The reception unit 34-2 converts the optical signal of the wavelength λ1 output from the optical coupler 37-2 into an electrical signal. The reception unit 34-2 outputs the converted electrical signal to an AMCC signal separation unit 35-2. The AMCC signal separation unit 35-2 separates the AMCC signal from the input electrical signal. Thus, the AMCC signal separation unit 35-2 can acquire the AMCC signal of the frequency f1 superimposed on the optical signal of the wavelength λ1.

The optical signals split into the second path by the power splitters 50-1 to 50-4 are processed in a similar manner to the processing described in the second embodiment.

According to the optical access system 1*b* configured as described above, by designating the connection relationships between the input ports and the output ports in the optical SW 36, it is possible to perform control so that optical signals of the same wavelength are not input to the same monitoring circuit 31. Furthermore, by using the optical SW 36 so that each optical signal is input to the monitoring circuit 31 designated for that optical signal as illustrated in FIG. 9, it is possible to economically configure the monitoring circuit 31 even in a case where there is a plurality of optical signals set to the same wavelength in the same network.

Modifications of Third Embodiment

Figure 10:
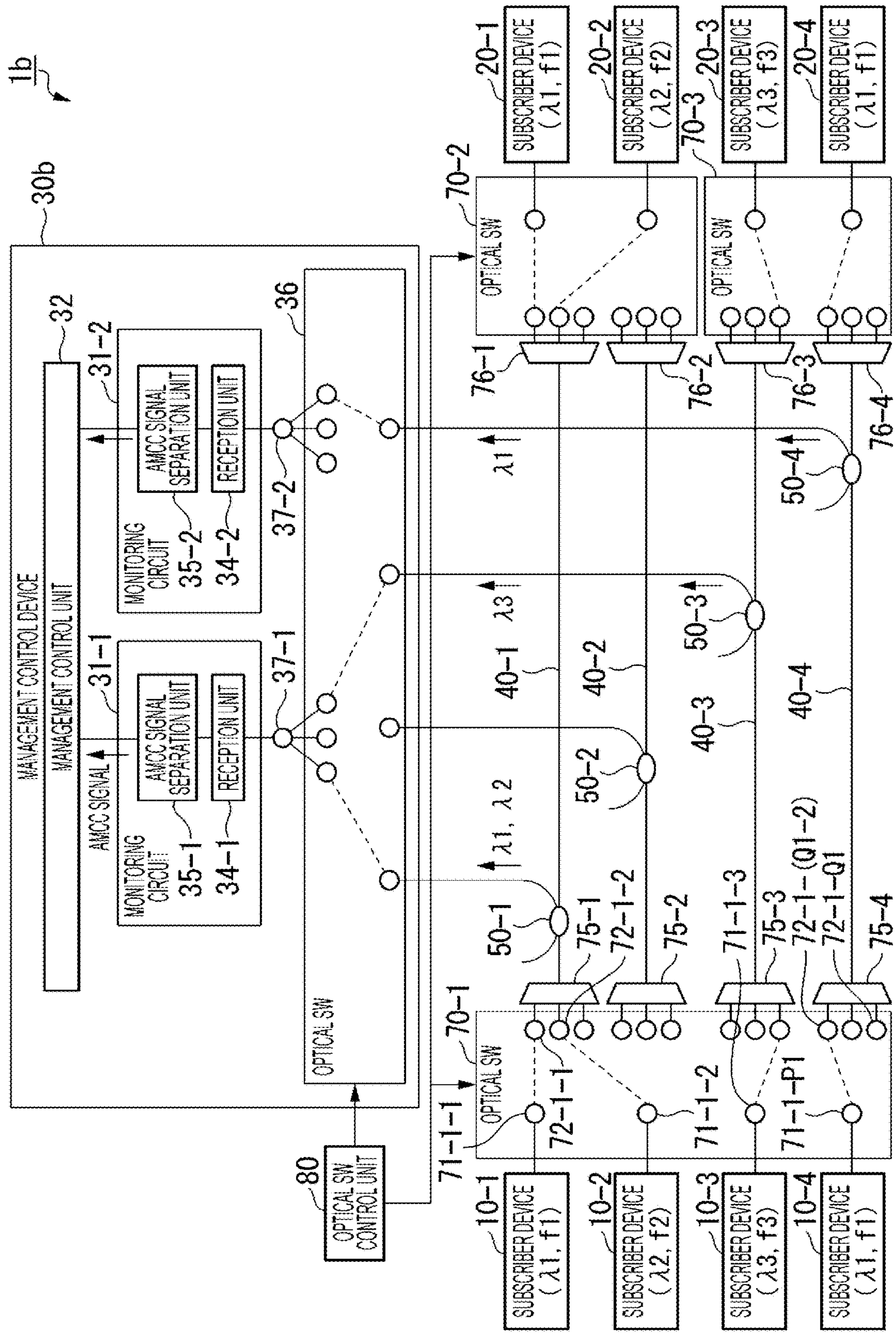
FIG. 10 is a diagram illustrating a configuration example of an optical access system according to a modification of the third embodiment.
Figure 11:
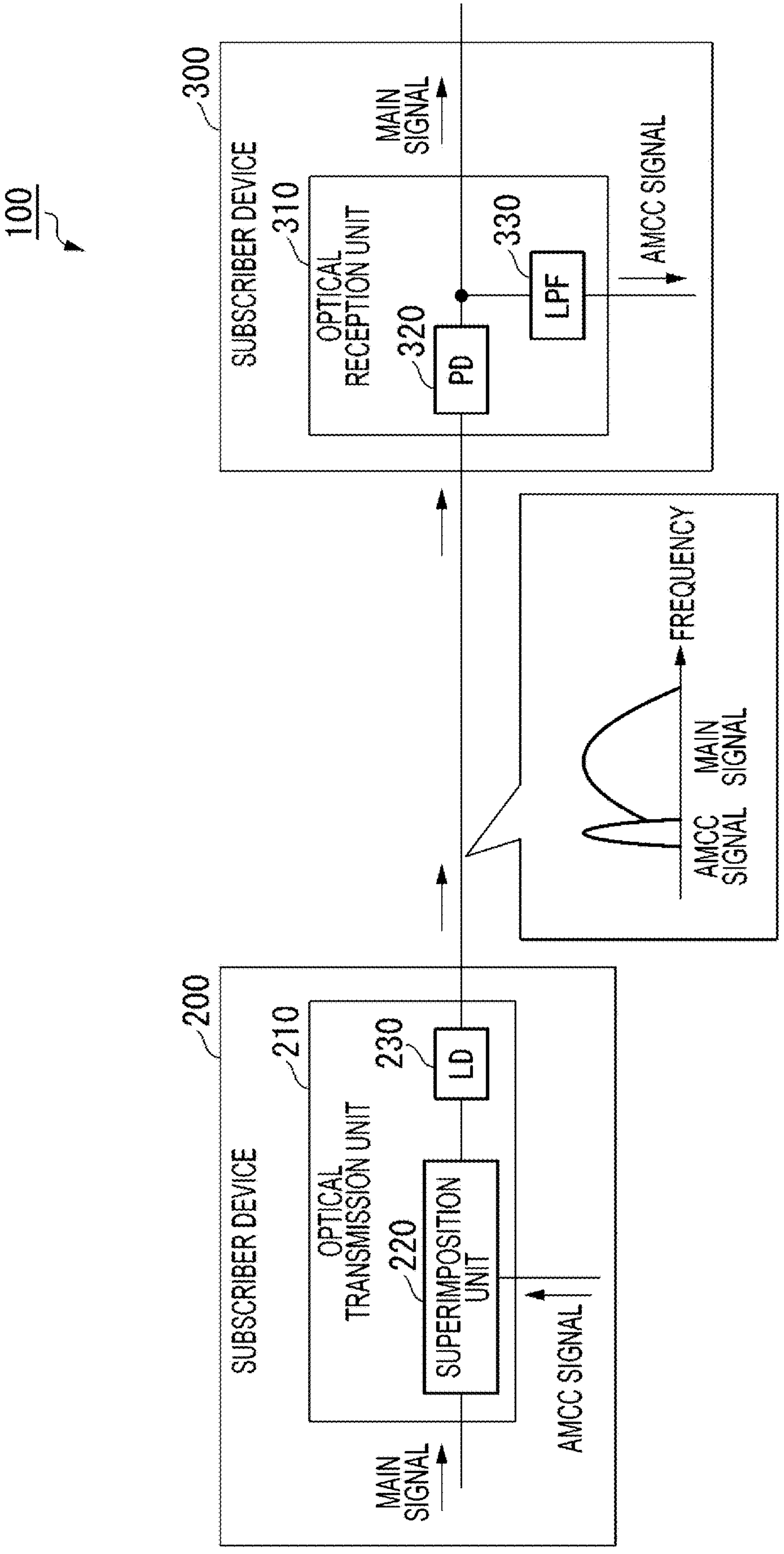
FIG. 11 is a diagram illustrating a configuration of a PtP WDM system using "low-frequency pilot tone".
Figure 12:
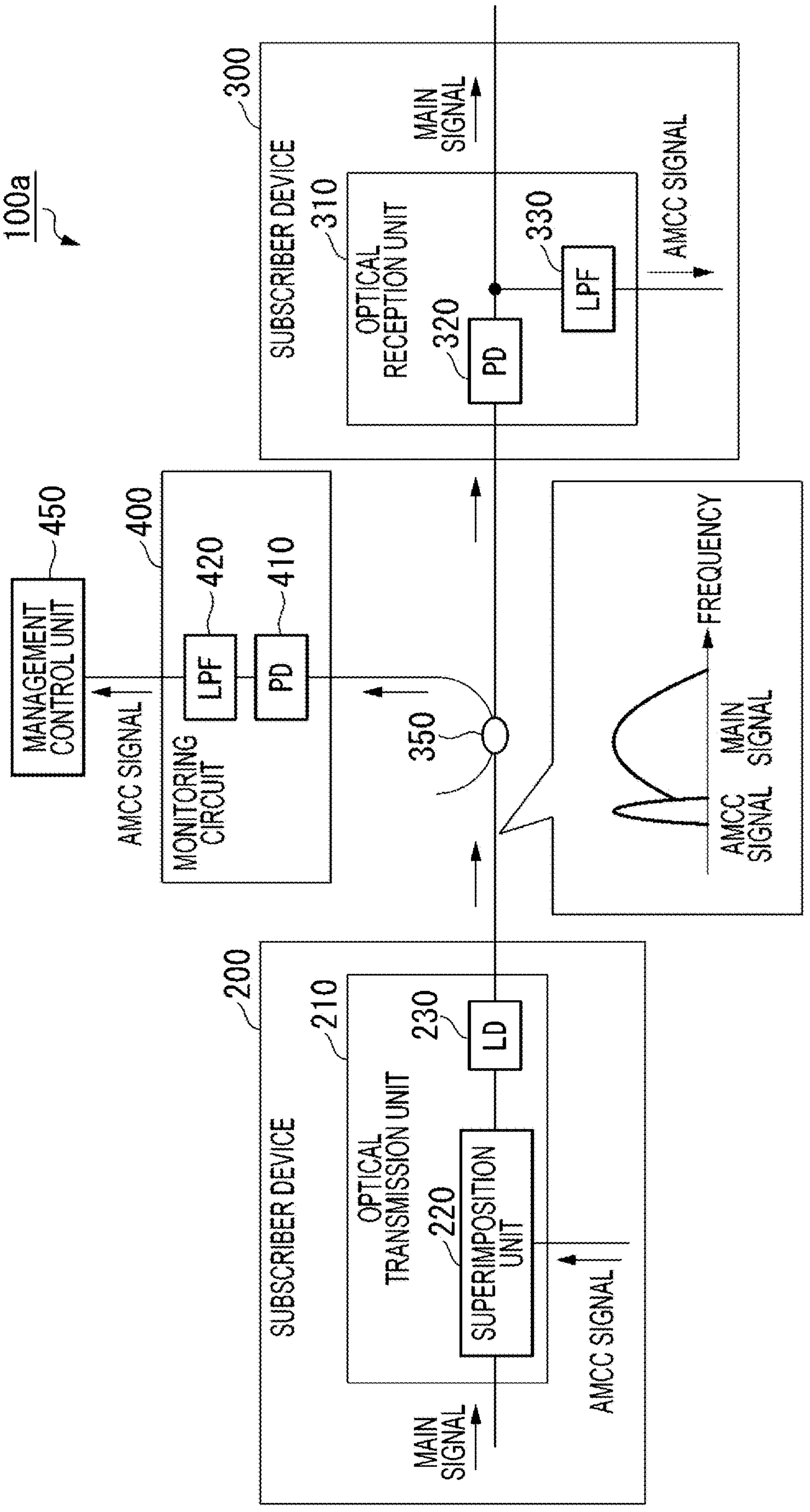
FIG. 12 is a diagram illustrating a configuration of another PtP WDM system.
Figure 13:
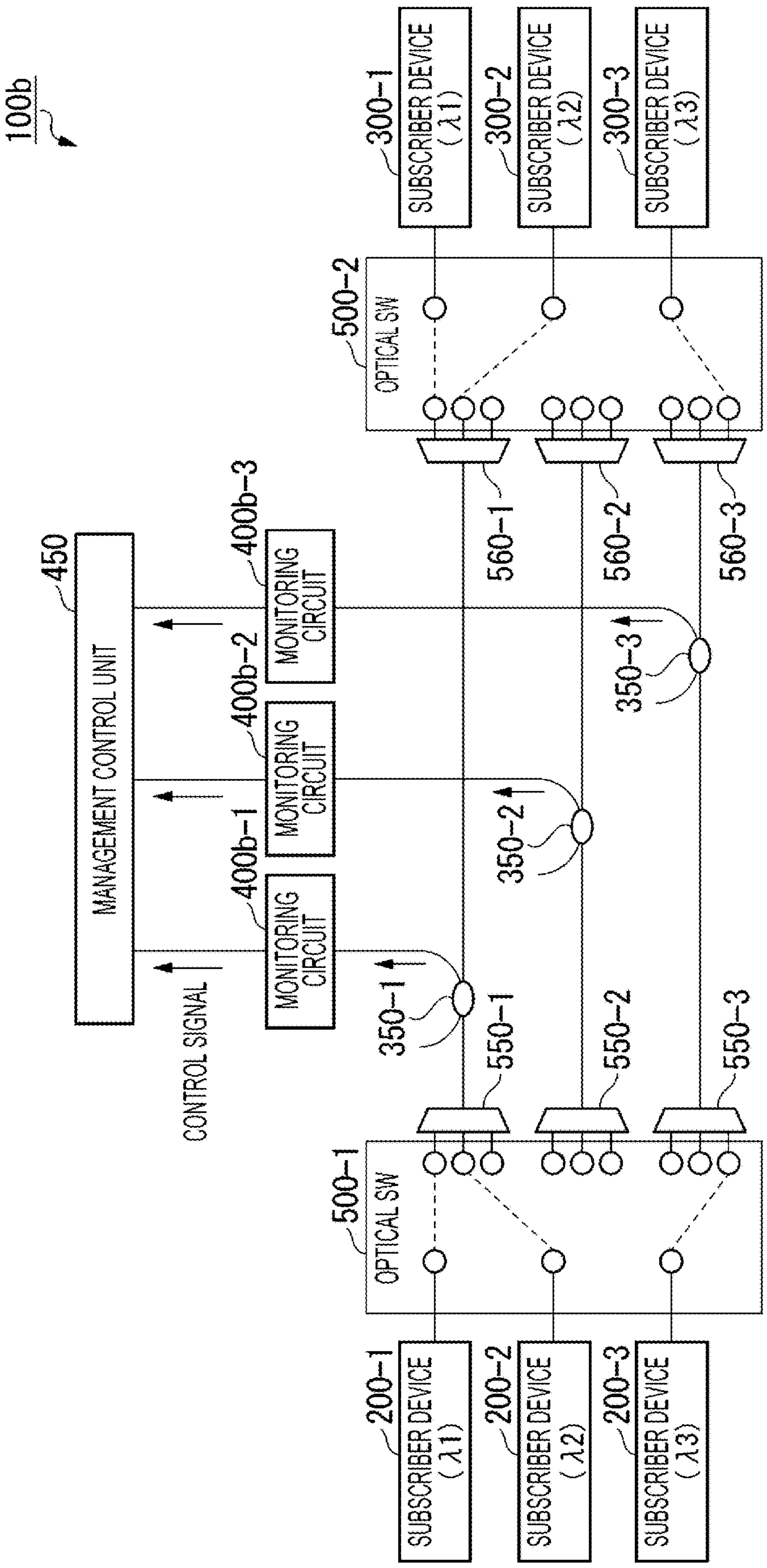
FIG. 13 is a diagram for illustrating a configuration of a WDM system in which a plurality of subscriber device pairs use different wavelengths for communication.
Figure 14:
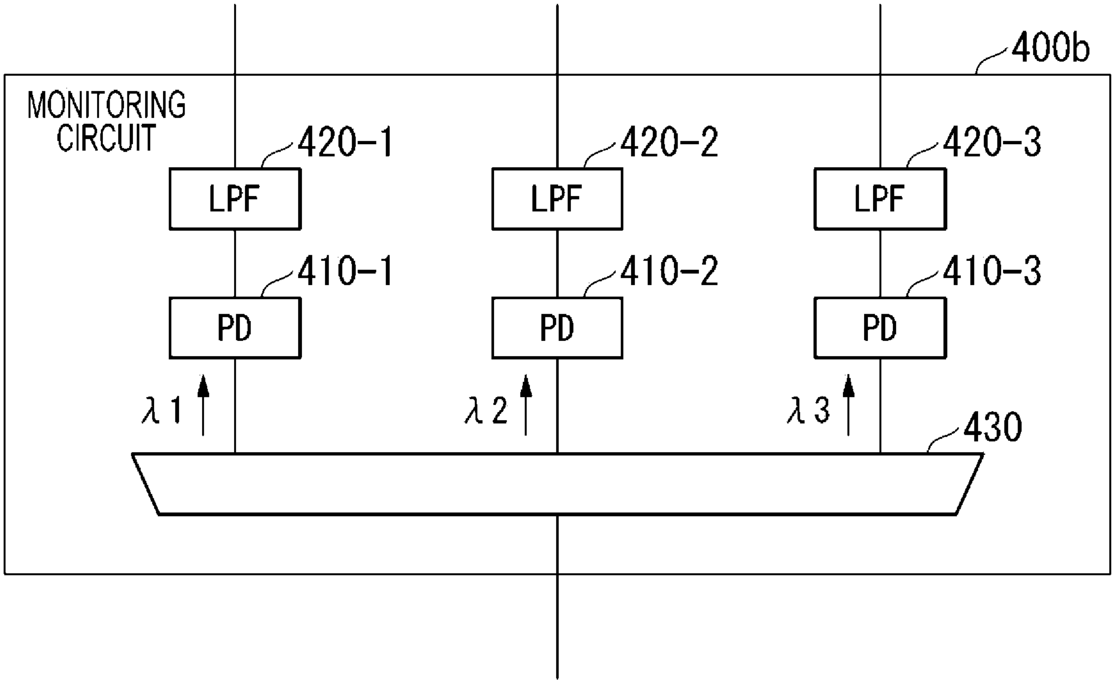
FIG. 14 is a diagram illustrating a specific configuration of a conventional monitoring circuit.

While FIG. 9 illustrates a configuration in which the subscriber devices 20-1 to 20-4 are accommodated in one optical SW 70-2, some of the subscriber devices 20-1 to 20-4 may be accommodated in another optical SW as illustrated in FIG. 10. FIG. 10 is a diagram illustrating a configuration example of an optical access system 1*b* according to a modification of the third embodiment. The optical access system 1*b* according to the modification of the third embodiment includes a plurality of subscriber devices 10-1 to 10-4, a plurality of subscriber devices 20-1 to 20-4, a management control device 30*b*, a plurality of power splitters 50-1 to 50-4, a plurality of optical SWs 70-1, 70-2, and 70-3, a plurality of optical multiplexers/demultiplexers 75-1 to 75-4 and 76-1 to 76-4, and an optical SW control unit 80.

The optical access system 1*b* according to the modification of the third embodiment illustrated in FIG. 10 is different from the optical access system 1*b* according to the third embodiment illustrated in FIG. 9 in that the optical SW 70-3 is newly provided. In the optical access system 1*b* according to the third embodiment illustrated in FIG. 9, the optical SW 70-2 accommodates the subscriber devices 20-*n*, whereas in the optical access system 1*b* according to the modification of the third embodiment illustrated in FIG. 10, the optical SW 70-2 accommodates the subscriber devices 20-1 and 20-2, and the optical SW 70-3 accommodates the subscriber devices 20-3 and 20-4.

As described above, for example, the subscriber devices 20 that use the same wavelength for communication may be accommodated in different optical SWs. The optical SW 70-3 has a configuration similar to that of the optical SW 70-2. In the optical SW 70-3, the connection relationships between the input ports and the output ports are controlled by the optical SW control unit 80.

With such a configuration, the subscriber devices 20 that use the same wavelength for communication are accommodated in different optical SWs, and this prevents an optical signal from being transferred, due to an error in path control, to the subscriber device 20 that uses the same wavelength for communication but has a different destination. Furthermore, optical signals of the same wavelength are prevented from being transmitted through the same optical transmission line 40. Thus, it is possible to reduce a possibility that AMCC signals cannot be extracted due to mixture of optical signals of the same wavelength.

In the third embodiment, the subscriber devices 10-*n* may also be configured such that some of the subscriber devices 10-*n* are included in another optical SW. In this case, the subscriber devices 10 that use the same wavelength may be accommodated in different optical SWs.

Modifications of First to Third Embodiments

While the first to third embodiments show a configuration in which, in both the subscriber devices 10 and the subscriber devices 20, an AMCC signal is superimposed in the electrical domain on the transmission side and the AMCC signal is separated in the electrical domain on the reception side, a configuration may be adopted in which an AMCC signal is superimposed in the optical domain on the transmission side, and the AMCC signal is separated in the electrical domain on the reception side.

In the second and third embodiments, a modification may be made as in the first embodiment.

Some of the functions of the management control devices 30 and 30*b* may be provided outside.

Some of the functional units of the management control devices 30 and 30*b* according to the above-described embodiments may be implemented by a computer. In that case, a program for implementing these functions may be recorded in a computer-readable recording medium, and the program recorded in the recording medium may be read and executed by a computer system to implement the functions. The "computer system" mentioned herein includes an OS and hardware such as a peripheral device.

The "computer-readable recording medium" refers to a portable medium such as a flexible disk, a magneto-optical disc, a ROM, or a CD-ROM, or a storage device such as a hard disk included in the computer system. Further, the "computer-readable recording medium" may include a medium that dynamically holds the program for a short time, such as a communication line in a case where the program is transmitted via a network such as the Internet or a communication line such as a telephone line, and a medium that holds the program for a certain period of time, such as a volatile memory inside the computer system serving as a server or a client in that case. Also, the above program may be for implementing some of the functions described above, may be formed with a combination of the functions described above and a program already recorded in the computer system, or may be formed with a programmable logic device such as an FPGA.

While the embodiments of this invention have been described in detail with reference to the drawings, specific configurations are not limited to these embodiments, and include designs and the like without departing from the spirit of this invention.

INDUSTRIAL APPLICABILITY

The present invention can be applied to a technology for monitoring management control signals (AMCC signals) in an optical access system that uses a plurality of optical transmission lines for communication.

REFERENCE SIGNS LIST

10-1 to 10-4, 20-1 to 20-4 Subscriber device
30, 30*b* Management control device

31, 31*b*, 31-1 to 31-2 Monitoring circuit
32 Management control unit
34-1 to 34-2 Reception unit
35-1 to 35-2 AMCC signal separation unit
37, 37-1 to 37-2 Optical coupler
50-1 to 50-4 Power splitter
60 Optical coupler
36, 70-1 to 70-3 Optical SW
75-1 to 75-4, 76-1 to 76-4 Optical multiplexer/demultiplexer
80 Optical SW control unit
371 Power monitor
351-1 to 351-3 Oscillator
352-1 to 352-3 Mixer
353-1 to 353-3 LPF
354 A/D conversion unit
355 Digital signal processor

The invention claimed is:

1. An optical access system that performs communication using an optical signal in which a management control signal used for management and control is superimposed in a plurality of transmission lines connecting a plurality of subscriber devices, wherein the plurality of subscriber devices generates a plurality of optical signals by superimposing the management control signals of different frequencies on main signals of different wavelengths, and transmits the plurality of optical signals that has been generated, and the optical access system includes a monitor configured to receive multiplexed optical signal generated by multiplexing the plurality of optical signals transmitted from the plurality of subscriber devices, and acquire a plurality of management control signals of different frequencies from the plurality of optical signals contained within the multiplexed optical signal that has been received, wherein the multiplexed optical signal is generated by combining the plurality of optical signals that have been split on each of plurality of transmission lines.

2. The optical access system according to claim 1, wherein the plurality of subscriber devices up-converts management control signals with signals of different frequencies output from a plurality of corresponding oscillators set to different frequencies, in such a way as to generate management control signals of the different frequencies, and generates the plurality of optical signals by superimposing the generated management control signals of the different frequencies on main signals of different wavelengths.

3. The optical access system according to claim 1, wherein the monitor includes a single receiver and a management control signal separator configured o acquire each of superimposed management control signals of different frequencies, the receiver collectively receives the management control signals of different frequencies superimposed on main signals of different wavelengths, and the management control signal separator acquires the management control signals of different frequencies from the signals received by the receiver.

4. The optical access system according to claim 3, wherein the management control signal separator includes:

oscillators that are the same in number as the management control signals and output signals of different frequencies;

mixers that are the same in number as the management control signals and down-convert the signals received by the receiver with signals of different frequencies output from the plurality of corresponding oscillators; and filters that are the same in number as the management control signals and acquire a plurality of management control signals of different frequencies from the down-converted signals.

5. The optical access system according to claim 1, wherein the plurality of subscriber devices transmits optical signals in which wavelength spacing has been set in such a way that optical beat noise is outside a reception band of the monitor.

6. The optical access system according to claim 1, further comprising:

a plurality of splitters that are provided one for each transmission line and split the plurality of optical signals transmitted from the plurality of corresponding subscriber devices; and a multiplexer that is provided between the monitor and the plurality of splitters, and multiplexes and outputs, to the monitor, a plurality of optical signals split by the plurality of splitters.

7. The optical access system according to claim 1, wherein the monitor includes at least a first monitor and a second monitor, the optical access system further comprises:

a second subscriber device that generates an optical signal by superimposing a management control signal of the same frequency as the frequency of at least one of the plurality of subscriber devices on a main signal of the same wavelength as the wavelength of at least one of the plurality of subscriber devices, and transmits the generated optical signal;

a plurality of splitters that are provided one for each transmission line and split each of the plurality of optical signals transmitted from one of the plurality of corresponding subscriber devices and the second subscriber device;

an optical switch that is provided between the monitor and the plurality of splitters, receives a plurality of optical signals split by the plurality of splitters, and switches between paths in such a way as to connect an input port and a designated output port;

a first multiplexer configured to multiplex and outputs, to the first monitor, optical signals output from the optical switch; and a second multiplexer configured to multiplex and outputs, to the second monitor, optical signals output from the optical switch, and the optical switch switches between paths in such a way as to connect a port to which an optical signal is input and a designated output port in such a way that optical signals of the same wavelength are not output to the same monitor.

8. A monitoring method in an optical access system that performs communication using an optical signal in which a management control signal used for management and control is superimposed in a plurality of transmission lines connecting a plurality of subscriber devices, the monitoring method comprising:

generating, by the plurality of subscriber devices, a plurality of optical signals by superimposing the management control signals of different frequencies on main signals of different wavelengths, and transmitting the plurality of optical signals that has been generated, and receiving, by a monitor that acquires a management control signal from an optical signal, multiplexed optical signal generated by multiplexing the plurality of optical signals transmitted from the plurality of subscriber devices, and acquiring a plurality of management control signals of different frequencies from the plurality of optical signals contained within the multiplexed optical signal that has been received, wherein the multiplexed optical signal is generated by combining the plurality of optical signals that have been split on each of plurality of transmission lines.

9. A control device in an optical access system that performs communication using an optical signal in which a management control signal used for management and control is superimposed in a plurality of transmission lines connecting a plurality of subscriber devices, the control device comprising:

a monitor configured to receive multiplexed optical signal generated by multiplexing a plurality of optical signals transmitted from the plurality of subscriber devices, and acquire a plurality of management control signals of different frequencies from the plurality of optical signals contained within the multiplexed optical signal that has been received, wherein the plurality of optical signals are signals generated by each of the plurality of subscriber devices by superimposing the management control signals of different frequencies on main signals of different wavelengths, and wherein the multiplexed optical signal is generated by combining the plurality of optical signals that have been split on each of plurality of transmission lines.

* * * * *